US012585292B2

(12) United States Patent
Ryde et al.

(10) Patent No.: US 12,585,292 B2
(45) Date of Patent: Mar. 24, 2026

(54) LOCATION BASED CHANGE DETECTION WITHIN IMAGE DATA BY A MOBILE ROBOT

(71) Applicant: Boston Dynamics, Inc., Waltham, MA (US)

(72) Inventors: Julian Ryde, East Hampton, CT (US); Yi Dong, Braintree, MA (US); Marco da Silva, Arlington, MA (US); Christopher Stathis, Bedford, MA (US); Karthik Ramachandran, Sunnyvale, CA (US)

(73) Assignee: Boston Dynamics, Inc., Waltham, MA (US)

( * ) Notice: Subject to any disclaimer, the term of this patent is extended or adjusted under 35 U.S.C. 154(b) by 86 days.

(21) Appl. No.: 18/541,874

(22) Filed: Dec. 15, 2023

(65) Prior Publication Data

US 2024/0377843 A1 Nov. 14, 2024

Related U.S. Application Data

(60) Provisional application No. 63/500,780, filed on May 8, 2023.

(51) Int. Cl.
*G05D 1/00* (2024.01)
*B62D 57/032* (2006.01)
(Continued)

(52) U.S. Cl.
CPC ........... *G05D 1/689* (2024.01); *B62D 57/032* (2013.01); *G06T 7/0002* (2013.01); *G06T 7/70* (2017.01);
(Continued)

(58) Field of Classification Search
CPC ............... G05D 1/689; G05D 2109/12; G05D 2105/89; G06T 7/70; G06T 7/0002;
(Continued)

(56) References Cited

U.S. PATENT DOCUMENTS 6,904,334 B2 6/2005 Asano et al.
8,060,344 B2 11/2011 Stathis
(Continued)

FOREIGN PATENT DOCUMENTS

JP 7495315 B2 * 6/2024
WO WO 2008/060689 5/2008
(Continued)

OTHER PUBLICATIONS

Translation JP7495315 (Year: 2022).*
(Continued)

*Primary Examiner* — Tiffany P Young
(74) *Attorney, Agent, or Firm* — Knobbe, Martens, Olson & Bear, LLP

(57) ABSTRACT

Systems and methods are described for detecting changes at a location based on image data by a mobile robot. A system can instruct navigation of the mobile robot to a location. For example, the system can instruct navigation to the location as part of an inspection mission. The system can obtain input identifying a change detection. Based on the change detection and obtained image data associated with the location, the system can perform the change detection and detect a change associated with the location. For example, the system can perform the change detection based on one or more regions of interest of the obtained image data. Based on the detected change and a reference model, the system can determine presence of an anomaly condition in the obtained image data.

23 Claims, 16 Drawing Sheets

(51) Int. Cl.

| | |
|---|---|
| *G05D 1/689* | (2024.01) |
| *G06T 7/00* | (2017.01) |
| *G06T 7/70* | (2017.01) |
| G05D 105/80 | (2024.01) |
| G05D 109/12 | (2024.01) |

(52) U.S. Cl.
CPC ..... *G05D 2105/89* (2024.01); *G05D 2109/12* (2024.01); *G06T 2207/20084* (2013.01); *G06T 2207/20104* (2013.01); *G06T 2207/30244* (2013.01)

(58) Field of Classification Search
CPC . G06T 2207/20084; G06T 2207/20104; G06T 2207/30244; B62D 57/032
USPC .......................................................... 701/2
See application file for complete search history.

(56) References Cited

U.S. PATENT DOCUMENTS

| | | |
|---|---|---|
| 8,410,732 B2 | 4/2013 | Kassow et al. |
| 8,594,844 B1 | 11/2013 | Gal |
| 8,614,559 B2 | 12/2013 | Kassow et al. |
| 8,725,273 B2 | 5/2014 | Lenser et al. |
| 8,779,715 B2 | 7/2014 | Kassow et al. |
| 8,874,261 B2 | 10/2014 | Hein et al. |
| 8,929,603 B1 | 1/2015 | Maali et al. |
| 9,592,912 B1 | 3/2017 | Michini et al. |
| 9,747,698 B2 | 8/2017 | Stathis |
| 9,770,823 B2 | 9/2017 | Huang |
| 9,858,712 B2 | 1/2018 | Stathis |
| 9,876,993 B2 | 1/2018 | Sablak et al. |
| 10,155,166 B1 | 12/2018 | Taylor et al. |
| 10,410,328 B1 | 9/2019 | Liu et al. |
| 11,331,799 B1 | 5/2022 | Shafer |
| 11,372,408 B1 | 6/2022 | Webster et al. |
| 11,416,003 B2 | 8/2022 | Whitman et al. |
| 11,537,130 B2 | 12/2022 | Gaschler |
| 11,712,802 B2 | 8/2023 | Chestnutt et al. |
| 11,787,050 B1 | 10/2023 | Kaehler et al. |
| 11,797,016 B2 | 10/2023 | Seifert et al. |
| 12,094,195 B2 | 9/2024 | Komoroski |
| 12,151,380 B2 | 11/2024 | Whitman et al. |
| 12,304,083 B2 | 5/2025 | Zheng et al. |
| 12,346,116 B2 | 7/2025 | Seifert et al. |
| 2002/0169733 A1 | 11/2002 | Peters, II et al. |
| 2002/0183896 A1 | 12/2002 | Ogure et al. |
| 2004/0193321 A1 | 9/2004 | Anfindsen et al. |
| 2004/0199302 A1 | 10/2004 | Pillar et al. |
| 2005/0041839 A1 | 2/2005 | Saitou et al. |
| 2005/0126144 A1 | 6/2005 | Koselka et al. |
| 2005/0222713 A1 | 10/2005 | Kawabe et al. |
| 2009/0052740 A1 | 2/2009 | Sonoura |
| 2010/0036527 A1 | 2/2010 | Matsunaga et al. |
| 2011/0231016 A1 | 9/2011 | Goulding |
| 2011/0264265 A1 | 10/2011 | Kanemoto |
| 2012/0121161 A1 | 5/2012 | Eade et al. |
| 2012/0155775 A1 | 6/2012 | Ahn et al. |
| 2012/0158183 A1 | 6/2012 | Lim et al. |
| 2012/0197464 A1 | 8/2012 | Wang et al. |
| 2012/0280087 A1 | 11/2012 | Coffman et al. |
| 2013/0231779 A1 | 9/2013 | Purkayastha et al. |
| 2013/0338525 A1 | 12/2013 | Allen |
| 2014/0129027 A1 | 5/2014 | Schnittman |
| 2014/0336848 A1 | 11/2014 | Saund et al. |
| 2015/0269439 A1 | 9/2015 | Versace et al. |
| 2015/0296142 A1 | 10/2015 | Cappel-Porter et al. |
| 2016/0188977 A1 | 6/2016 | Kearns et al. |
| 2017/0329347 A1 | 11/2017 | Passot et al. |
| 2017/0358201 A1 | 12/2017 | Govers et al. |
| 2018/0141562 A1 | 5/2018 | Singhal |
| 2018/0181137 A1 | 6/2018 | Choi et al. |
| 2018/0236654 A1 | 8/2018 | Mozeika et al. |
| 2018/0364045 A1 | 12/2018 | Williams et al. |

| | | | |
|---|---|---|---|
| 2019/0086894 A1 | 3/2019 | Tenorth | |
| 2019/0184572 A1 | 6/2019 | Hayashi | |
| 2019/0185186 A1 | 6/2019 | Li | |
| 2019/0307106 A1 | 10/2019 | Hartung et al. | |
| 2020/0012239 A1 | 1/2020 | Yamamoto | |
| 2020/0070343 A1 | 3/2020 | Thomaz et al. | |
| 2020/0174484 A1 | 6/2020 | Eoh et al. | |
| 2020/0206918 A1 | 7/2020 | Sun | |
| 2021/0041243 A1 | 2/2021 | Fay et al. | |
| 2021/0041878 A1 | 2/2021 | Seifert et al. | |
| 2021/0181750 A1 | 6/2021 | Gogna et al. | |
| 2021/0206367 A1* | 7/2021 | Liu ..................... | G08G 1/0112 |
| 2021/0318687 A1 | 10/2021 | Seifert et al. | |
| 2021/0346557 A1 | 11/2021 | Brooks et al. | |
| 2022/0083058 A1 | 3/2022 | Passot et al. | |
| 2022/0083061 A1 | 3/2022 | Xie et al. | |
| 2022/0083076 A1 | 3/2022 | Maeda | |
| 2022/0113745 A1 | 4/2022 | Panigrahi et al. | |
| 2022/0130147 A1* | 4/2022 | Courteville ............ | G06V 20/52 |
| 2022/0138612 A1* | 5/2022 | Vengertsev ........... | G06F 16/285 |
| | | | 706/12 |
| 2022/0139027 A1 | 5/2022 | Luo et al. | |
| 2022/0187828 A1 | 6/2022 | Miyagawa | |
| 2022/0193905 A1 | 6/2022 | Berard et al. | |
| 2022/0194245 A1 | 6/2022 | Gonana et al. | |
| 2022/0237910 A1 | 7/2022 | Hirai et al. | |
| 2022/0241980 A1 | 8/2022 | Bollini et al. | |
| 2022/0258356 A1 | 8/2022 | Chi et al. | |
| 2022/0305657 A1 | 9/2022 | Hong et al. | |
| 2022/0383128 A1* | 12/2022 | Gonzales ............. | G06V 10/764 |
| 2022/0388170 A1 | 12/2022 | Merewether | |
| 2022/0388174 A1 | 12/2022 | Stathis et al. | |
| 2022/0390950 A1 | 12/2022 | Yamauchi | |
| 2023/0015335 A1 | 1/2023 | Gao et al. | |
| 2023/0016514 A1 | 1/2023 | Zheng et al. | |
| 2023/0055206 A1 | 2/2023 | Zheng et al. | |
| 2023/0087057 A1 | 3/2023 | Wang et al. | |
| 2023/0107289 A1 | 4/2023 | Maeda et al. | |
| 2023/0125422 A1 | 4/2023 | Tsuzaki | |
| 2023/0215024 A1 | 7/2023 | Huang | |
| 2023/0297118 A1 | 9/2023 | Yanks et al. | |
| 2023/0400863 A1 | 12/2023 | Chen et al. | |
| 2023/0418302 A1 | 12/2023 | Seifert et al. | |
| 2023/0418305 A1 | 12/2023 | Chestnutt et al. | |
| 2024/0061436 A1 | 2/2024 | Tsuzaki et al. | |
| 2024/0087738 A1 | 3/2024 | Wang et al. | |
| 2024/0160194 A1* | 5/2024 | Bakhshmand ......... | G06N 20/10 |
| 2025/0196345 A1 | 6/2025 | Rice et al. | |
| 2025/0284284 A1 | 9/2025 | Seifert et al. | |

FOREIGN PATENT DOCUMENTS

| | | |
|---|---|---|
| WO | WO 2021/211251 | 10/2021 |
| WO | WO 2022/256818 | 12/2022 |
| WO | WO 2023/140928 | 7/2023 |

OTHER PUBLICATIONS

Gulalkari et al., Object following control of six-legged robot using Kenect Camera. In 2014 International Conference on Advances in Computing, Communications and Informatics (ICACCI) Sep. 24, 2014 (pp. 758-764). IEEE.

International Search Report and Written Opinion received in Application No. PCT/US2023/084269, mailed May 7, 2024, 15 pages.

Echegoyen et al., "Visual Servoing of Legged Robots," Journal of Mathematical Imaging and Vision, Kluwer Academic Publishers, vol. 42, No. 2-3, dated Apr. 29, 2011, pp. 196-211.

Girshick, "Fast R-CNN," Computer Vision and Pattern Recognition, arXiv:1504.08083 [cs.CV] version 2, dated Sep. 27, 2015 in 9 pages.

Hosoda et al., "Vision-Based Servoing Control for Legged Robots," Proceedings of the 1997 IEEE International Conference on Robotics and Automation Albuquerque, New Mexico, vol. 4, dated Apr. 4, 1997, pp. 3154-3159.

Hutchinson et al., "A Tutorial on Visual Servo Control," IEEE Transactions on Robotics and Automation, vol. 12, No. 5, dated Oct. 1996, pp. 651-670.

(56)         References Cited

OTHER PUBLICATIONS

Rublee et al., "ORB: an efficient alternative to SIFT or SURF," IEEE 2011 International Conference on Computer Vision, dated Nov. 6, 2011, pp. 2564-2571.

Scheper K.Y.W, "Behavior Trees for Evolutionary Robotics: Reducing the Reality Gap." Jun. 18, 2014, 197 pages.

International Search Report and Written Opinion received in Application No. PCT/US2021/022928, mailed Jun. 1, 2021, 10 pages.

International Search Report and Written Opinion received in Application No. PCT/US2022/072714, mailed Sep. 19, 2022, 18 pages.

International Search Report and Written Opinion received in Application No. PCT/US2022/051064, mailed Mar. 29, 2023, 10 pages.

"Anybotics Introduces End-to-End Robotic Inspection Solution," video screen shots taken from https://www.youtube.com/watch?v=g3odef0EAFA, Apr. 21, 2021, downloaded Apr. 3, 2025, 16 pages.

"ANYbotics Introduces End-to-End Robotic Inspection Solution,"|https://www.anybotics.com/news/anybotics-introduces-end-to-end-robotic-inspection-solution/, Apr. 21, 2021, printed Apr. 9, 2025, 11 pages.

"Guide to Industrial Inspection Robots: Identifying the Task you Want to Automate," https://www.anybotics.com/news/how-to-hire-an-industrial-inspection-robot-part-1/, Mar. 21, 2023, printed Apr. 9, 2025, 15 pages.

"Anybotics, Cognite & Accenture Enable Real End-to-End Robotic Inspection Solutions," https://www.anybotics.com/news/anybotics-cognite-accenture-enable-real-end-to-end-robotic-inspection-solutions/, May 30, 2022, printed Apr. 9, 2025, 13 pages.

"ANYmal Robots Inspecting PETRONAS' Offshore Platform (Webinar)," video screen shots taken from https://www.youtube.com/watch?v=aymdpFsdgbA, Jan. 22, 2021, downloaded Apr. 9, 2025, 19 pages.

"ANYmal X—Robotic Inspection in Ex-Rated Zones," video screen shots taken from https://vimeo.com/744482989, Aug. 30, 2022, downloaded Apr. 9, 2025, 13 pages.

"ANYmal @ ERL Emergency Robotics 2017," video screen shots taken from https://www.youtube.com/watch?v=qrJIMze_xhQ, Oct. 2, 2017, downloaded Apr. 9, 2025, 4 pages.

Lakrouf et al., "Moving Obstacles Detection and Camera Pointing for Mobile Robot Applications," In Proceedings of the 3rd International Conference on Mechatronics and Robotics Engineering Feb. 8, 2017 (pp. 57-62).

* cited by examiner

1000

Receive Input Indicating A Change Detection

1002

Receive A Reference Model

1004

Determine A Location Of A Robot Corresponds To A Location Associated With The Reference Model

1006

Obtain Sensor Data Captured From The Location Of The Robot

1008

Instruct Performance Of The Change Detection Based On The Sensor Data And The Reference Model

1010

1

LOCATION BASED CHANGE DETECTION WITHIN IMAGE DATA BY A MOBILE ROBOT

CROSS REFERENCE TO RELATED APPLICATIONS

This application claims priority under 35 U.S.C. § 119 (e) to U.S. Provisional Application 63/500,780, filed on May 8, 2023. The disclosure of this prior application is considered part of the disclosure of this application and is hereby incorporated by reference in its entirety.

TECHNICAL FIELD

This disclosure relates generally to robotics, and more specifically, to systems, methods, and apparatuses, including computer programs, for detecting changes within image data.

BACKGROUND

Robotic devices can autonomously or semi-autonomously navigate environments to perform a variety of tasks or functions. The robotic devices can utilize sensor data to navigate the environments. As robotic devices become more prevalent, there is a need to detect changes within the environment using the sensor data.

SUMMARY

An aspect of the present disclosure provides a method. The method may include instructing, by data processing hardware of a mobile robot, navigation of the mobile robot to a location as part of an inspection mission. The method may further include obtaining, by the data processing hardware, image data associated with the location as part of the inspection mission. The method may further include detecting, by the data processing hardware, based on one or more regions of interest of the image data, a change associated with the location. The method may further include determining, by the data processing hardware, presence of an anomaly condition in the image data based on the detected change and a reference model.

In various embodiments, the reference model may include at least one of a neural network, a collection of reference images, or a statistical model encapsulating a set of reference images.

In various embodiments, detecting the change may include detecting the change based on input from a remote site operator identifying the one or more regions of interest.

In various embodiments, the method may further include providing live feedback on the anomaly condition to the remote site operator.

In various embodiments, the anomaly condition may include a modification of a position of an object at the location.

In various embodiments, the object may include one of a lever, a door, a button, a switch, a dial, a handle, or a joint.

In various embodiments, obtaining the image data may include capturing the image data using one or more sensors of the mobile robot.

In various embodiments, the image data may be first image data. The method may further include instructing navigation of the mobile robot to the location as part of a mission before the inspection mission. The method may further include instructing movement of one or more sensors of the mobile robot to a particular position. The method may further include instructing capture of second image data by the one or more sensors at the particular position.

In various embodiments, detecting the change may include detecting a modification to one or more of a position, location, orientation, or pose of one or more of an object, a structure, an entity, or an obstacle in an environment of the robot.

In various embodiments, detecting the change may include detecting a presence of one or more of an object, a structure, an entity, or an obstacle in an environment of the robot.

In various embodiments, the method may further include obtaining an input indicating a change detection, wherein detecting the change comprises detecting the change based on the change detection.

In various embodiments, the method may further include obtaining an input indicating a change detection. Detecting the change may include detecting the change based on the change detection. The reference model may be associated with the change detection.

According to various embodiments of the present disclosure, a method may include receiving, at data processing hardware of a robot, a first input indicating a change detection. The method may further include receiving, by the data processing hardware, a reference model associated with the change detection and an identifier of a first location. The method may further include determining, by the data processing hardware, that a second location of the robot corresponds to the first location. The method may further include obtaining, by one or more sensors of the robot, first sensor data captured from the second location. The method may further include instructing performance, by the data processing hardware, of the change detection based on determining that the second location of the robot corresponds to the first location. Instructing performance of the change detection may include detecting presence of an anomaly condition based on analyzing the first sensor data using the reference model.

In various embodiments, the first location may include a location of the one or more sensors.

In various embodiments, the first location may include a location of one or more additional sensors of a user computing device.

In various embodiments, the second location may include a location of the one or more sensors.

In various embodiments, the first location may include a location of a body of the robot.

In various embodiments, the first location may include a first sub-location of a body of the robot and a second sub-location of the one or more sensors.

In various embodiments, the first location may include a first sub-location of a body of the robot and a second sub-location of one or more additional sensors of a user computing device.

In various embodiments, the method may further include instructing navigation by the robot to the second location based on a second input.

In various embodiments, receiving the first input may include receiving the first input via a user computing device.

In various embodiments, instructing performance of the change detection may include instructing alignment of the first sensor data with the reference model.

In various embodiments, instructing performance of the change detection may include instructing transformation of the first sensor data using a neural network.

In various embodiments, instructing performance of the change detection may include instructing performance of image differencing using the first sensor data.

In various embodiments, instructing performance of the change detection may include instructing adjustment of one or more of an illumination, a white balance, or a color balance of the first sensor data.

In various embodiments, instructing performance of the change detection may include instructing implementation of a neural network. The first sensor data may be provided to the neural network.

In various embodiments, instructing performance of the change detection may include instructing implementation of a neural network. The first sensor data may be provided to the neural network. The neural network may be trained to identify anomaly conditions within sensor data.

In various embodiments, instructing performance of the change detection may include instructing implementation of a neural network. The first sensor data may be provided to the neural network. The neural network may be trained to identify anomaly conditions within sensor data. Instructing performance of the change detection may further include instructing performance of image differencing using the first sensor data. The method may further include obtaining a first output based on instructing implementation of the neural network. The method may further include obtaining a second output based on instructing performance of image differencing. The method may further include comparing the first output to the second output.

In various embodiments, instructing performance of the change detection may include instructing implementation of a neural network. The first sensor data may be provided to the neural network. The neural network may be trained to identify anomaly conditions within sensor data. Instructing performance of the change detection may further include instructing performance of image differencing using the first sensor data. The method may further include obtaining a first output based on instructing implementation of the neural network. The method may further include obtaining a second output based on instructing performance of image differencing. The method may further include comparing the first output to the second output. The method may further include detecting presence of the anomaly condition within the first sensor data based on comparing the first output to the second output.

In various embodiments, instructing performance of the change detection may include instructing implementation of a neural network. The first sensor data may be provided to the neural network. The neural network may be trained to identify anomaly conditions within sensor data. Instructing performance of the change detection may further include instructing performance of image differencing using the first sensor data. The method may further include obtaining a first output based on instructing implementation of the neural network. The method may further include obtaining a second output based on instructing performance of image differencing. The method may further include comparing the first output to the second output to obtain a first comparison result. The method may further include comparing the first comparison result to a threshold value to obtain a second comparison result. The method may further include detecting presence of the anomaly condition within the first sensor data based on the second comparison result.

In various embodiments, the reference model may include second sensor data from the one or more sensors.

In various embodiments, the reference model may include second sensor data from one or more additional sensors.

In various embodiments, the reference model may include second sensor data from one or more additional sensors external to the robot.

In various embodiments, the reference model may include second sensor data from one or more additional sensors of a user computing device.

In various embodiments, receiving the reference model may include obtaining second sensor data. Receiving the reference model may further include identifying a portion of the second sensor data based on the first input. The reference model may include the portion of the second sensor data.

In various embodiments, the reference model may include a statistical model.

In various embodiments, the reference model may include a neural network.

In various embodiments, the reference model may include a neural network and a statistical model.

In various embodiments, the change detection may include an anomaly detection.

In various embodiments, the change detection may include an action to detect a modification to one or more of a position, location, orientation, or pose of one or more of an object, a structure, an entity, or an obstacle in an environment of the robot.

In various embodiments, the change detection may include an action to detect a presence of one or more of an object, a structure, an entity, or an obstacle in an environment of the robot.

In various embodiments, the method may further include identifying the anomaly condition based on instructing performance of the change detection.

In various embodiments, the method may further include identifying the anomaly condition based on instructing performance of the change detection. The method may further include instructing display of a user interface indicating the anomaly condition.

In various embodiments, the method may further include identifying the anomaly condition based on instructing performance of the change detection. The method may further include generating log data based on identifying the anomaly condition. The method may further include storing the log data.

In various embodiments, the method may further include identifying the anomaly condition based on instructing performance of the change detection. The method may further include determining an alert based on identifying the anomaly condition. The method may further include instructing output of the alert.

In various embodiments, the method may further include obtaining one or more labels associated with the first sensor data based on instructing performance of the change detection. The one or more labels may indicate an anomaly status.

In various embodiments, instructing performance of the change detection may include detecting presence of the anomaly condition not based on analyzing the second sensor data using the reference model.

In various embodiments, the first input may indicate the one or more sensors from a plurality of sensors of the robot.

In various embodiments, the first input may indicate one or more of a position, orientation, location, or pose of the one or more sensors.

In various embodiments, the first sensor data may include a region of interest within the first sensor data. In various embodiments, the first input may indicate a region of interest within second sensor data from the one or more sensors.

In various embodiments, the robot may include a legged mobile robot.

According to various embodiments of the present disclosure, a system may include data processing hardware and memory in communication with the data processing hardware. The memory may store instructions that when executed on the data processing hardware may cause the data processing hardware to receive a first input indicating a change detection. Execution of the instructions may further cause the data processing hardware to receive a reference model associated with the change detection. Execution of the instructions may further cause the data processing hardware to determine that a first location of a robot corresponds to a second location. Execution of the instructions may further cause the data processing hardware to obtain first sensor data captured from the first location. Execution of the instructions may further cause the data processing hardware to instruct performance of the change detection based on determining that the first location of the robot corresponds to the second location. To instruct performance of the change detection, execution of the instructions may cause the data processing hardware to detect presence of an anomaly condition based on analyzing the first sensor data using the reference model.

In various embodiments, execution of the instructions may further cause the data processing hardware to perform any combination of the above features.

According to various embodiments of the present disclosure, a robot may include at least one sensor, at least two legs, data processing hardware in communication with the at least one sensor, and memory in communication with the data processing hardware. The memory may store instructions that when executed on the data processing hardware may cause the data processing hardware to receive a first input indicating a change detection. Execution of the instructions may further cause the data processing hardware to receive a reference model associated with the change detection. Execution of the instructions may further cause the data processing hardware to determine that a first location of the robot corresponds to a second location. Execution of the instructions may further cause the data processing hardware to obtain, by the at least one sensor, first sensor data captured from the first location. Execution of the instructions may further cause the data processing hardware to instruct performance of the change detection based on determining that the first location of the robot corresponds to the second location. To instruct performance of the change detection, execution of the instructions may cause the data processing hardware to detect presence of an anomaly condition based on analyzing the first sensor data using the reference model.

In various embodiments, execution of the instructions may further cause the data processing hardware to perform any combination of the above features.

The details of the one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
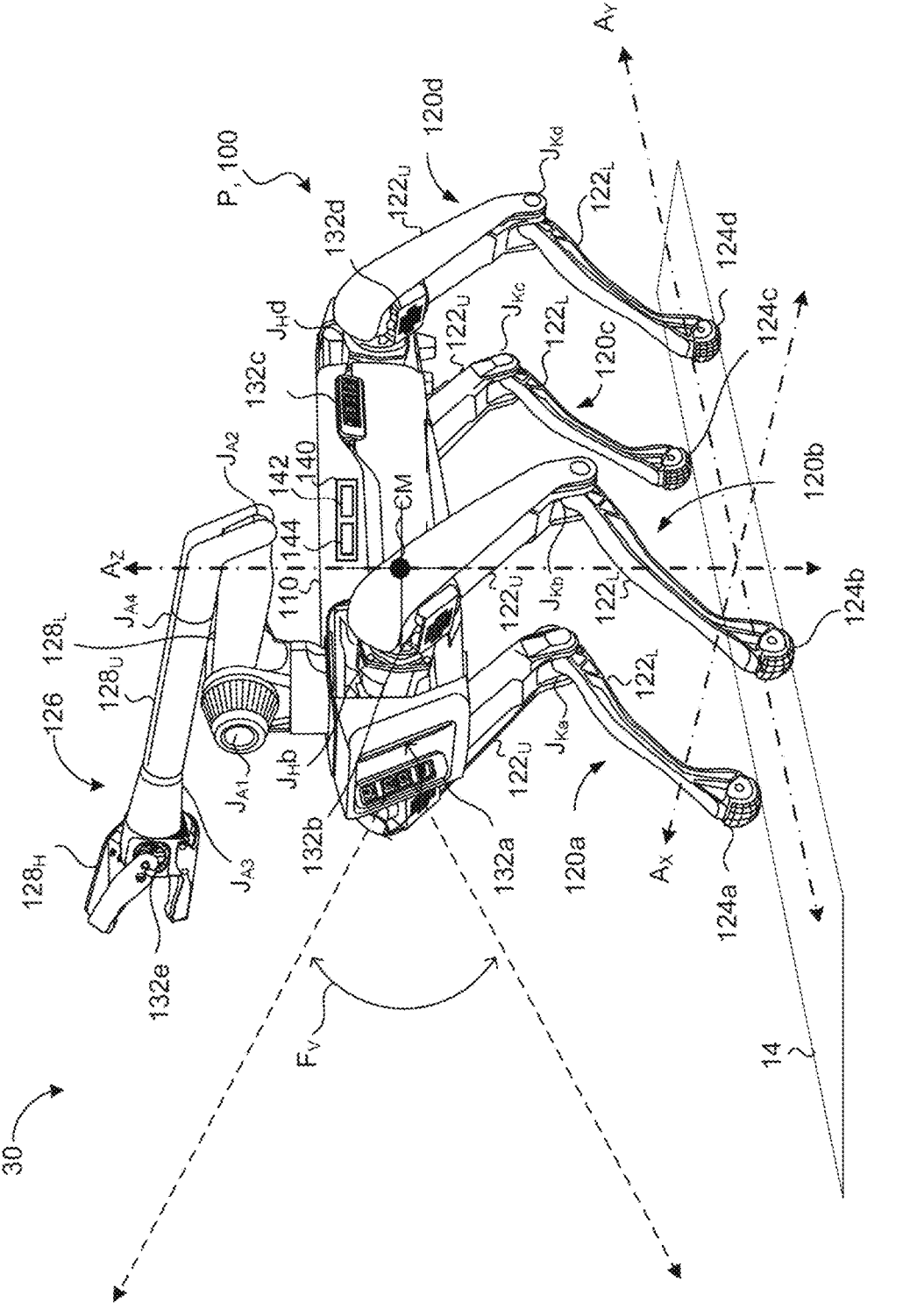
FIG. 1A is a schematic view of an example robot for navigating about an environment.

Generally described, autonomous and semi-autonomous robots can utilize mapping, localization, and/or navigation systems to map an environment utilizing sensor data obtained by the robots. Further, the robots can utilize the systems to perform navigation and/or localization in the environment.

The present disclosure relates to the use of sensor data obtained by the robot to perform a change detection (e.g., to detect a change associated with an object, obstacle, entity, or structure within the environment). A system can perform the change detection based on the location of the robot such that the change detection is customized according to the location of the robot. For example, the system can perform the change detection based on a location, position, orientation, pose, etc. of a body, an arm, a sensor, etc. of the robot.

The system can identify sensor data (e.g., point cloud data, etc.) associated with the environment (e.g., sensor data associated with traversal of the environment by a robot). For example, the system can communicate with a sensor of a robot and obtain sensor data associated with an environment of the robot as the robot traverses the environment. In some cases, the robot can perform an inspection mission (e.g., to inspect the environment) and the sensor data may be based on the inspection mission.

The sensor data may reflect features of the environment (e.g., associated with obstacles, objects, structures, or entities). For example, the features may correspond to one or more walls, stairs, humans, robots, vehicles, toys, pallets, rocks, switches, actuators, levers, doors, buttons, windows, dial, handles, joints, screens (e.g., touchscreens, displays, etc.), etc. within the environment. The features may correspond to static obstacles, objects, structures, and/or entities (e.g., obstacles that are not capable of self-movement) and/or dynamic obstacles, objects, structures, and/or entities (e.g., obstacles that are capable of self-movement). Further, the obstacles, objects, structures, and/or entities may be integrated into the environment (e.g., the walls, stairs, the ceiling, etc.) or may not be integrated into the environment (e.g., a ball on the floor or on a stair).

The sensor data may reflect features corresponding to obstacles, objects, structures, and/or entities within the environment based on a particular protocol. In some cases, the sensor data may indicate the presence of a feature based on the absence of sensor data and/or a grouping of sensor data. For example, a grouping of sensor data in a particular shape or configuration may indicate the presence of a particular feature corresponding to a particular obstacle, object, structure, and/or entity (e.g., a box, a platform, etc.).

Based on the sensor data, the system may identify an object in the environment. For example, the system may identify the presence of a box in the environment based on the sensor data. In another example, the system may identify the presence of a switch in the environment based on the sensor data.

In some cases, the system may provide the sensor data to a user computing device for review. For example, the system may provide the sensor data (e.g., a visualization of the sensor data via a user interface of the user computing device for review by the user.

In traditional systems, while systems may identify objects using sensor data and may provide the sensor data to a user computing device for display and/or review, the systems may be unable to detect changes within the sensor data (e.g., relative to a reference model). Instead, the systems may be limited to providing the sensor data to the user computing device.

In some cases, the systems may be implemented on (e.g., located at, affixed to, etc.) static (e.g., non-moving) platforms (e.g., the systems may obtain sensor data from an image sensor located at, affixed to, etc. a static location). For example, the systems may be implemented via static platforms that are not capable of movement throughout an environment. Such systems may be dependent on the location of the platform being static. While the systems may obtain sensor data, as the systems are implemented via static platforms, such systems may not be suitable for particular environments (e.g., environments where the locations of the objects, obstacles, structures, or entities is unknown or dynamic, environments with multiple objects, obstacles, structures, or entities, etc.). For example, the systems may only be suitable for an environment with a single object, obstacle, structure, or entity that is being monitored to detect a change. The use of such systems may be inefficient and/or cost prohibitive as such systems may require image sensors at a plurality of static locations within the environment to perform the change detection.

In some cases, a system may be unable to detect changes in environments with different lighting parameters (e.g., brightness, shadows, etc.). For example, a system may be unable to detect changes if one or more lighting parameters of the environment change (e.g., if the brightness decreases below a particular level). Such systems may be disadvantageous as the systems may be dependent on the lighting parameters of the environment not changing.

In some cases, a system may be unable to detect changes without being trained on a particular scene (e.g., a particular portion, view, etc. within the environment) and/or image data from a particular image sensor. The use of such systems may be inefficient, cost prohibitive, etc. as such systems may require the system to be separately set up, trained, and configured for each scene and/or image sensor.

Therefore, such traditional systems may cause issues and/or inefficiencies (e.g., inefficiencies in detecting changes and determining corresponding anomalies) as the systems may not be able to detect changes while maintaining a mobile nature of the systems (e.g., the robot). Further, such an inability may cause a loss of confidence in the performance of the systems.

In some cases, a user may attempt to manually detect a change. However, such a process may be inefficient and error prone as the robot may be associated with a large amount of sensor data. For example, the robot may include a plurality of sensors that each may continuously obtain sensor data. Further, implementing such a trial-and-error process may be time intensive and may cause delays in performance of other commands by the robot.

The methods and apparatus described herein enable a system to detect a change to the environment and/or a change to an object, obstacle, structure, or entity within the environment. The system can obtain sensor data (e.g., base sensor data, initial sensor data, etc.) via one or more sensors of a robot. For example, the sensor data may include image data. The system can obtain the sensor data based on traversal of the environment by the robot (e.g., as the robot patrols a prerecorded path through the environment). For example, the system can obtain the sensor data during or as part of a base or initial mission (e.g., a mission to map an environment). For example, the system can obtain the sensor data based on an inspection mission associated with the robot. The sensor data may include sensor data prior to occurrence of a change and the system may use the sensor data to establish a baseline (e.g., a standard) for the environment (e.g., a lever is in a first position, a button is in a second position, a leak is not present, an environment includes particular equipment, etc.). Therefore, the robot may traverse an environment to perform an inspection mission, may obtain sensor data based on performing the inspection mission, and may provide the sensor data to the system.

In some cases, the system can obtain the sensor data in real time as the robot traverses the environment. For example, the sensor data may represent a real time view associated with a sensor of the robot.

The system can instruct display of the sensor data (or a representation of the sensor data) via a display of a user computing device. The system may receive an input from the user computing device defining a region of interest (e.g., a particular frame, a subset of a particular frame, etc.) within the sensor data. For example, the input may define a portion of the sensor data for performing a change detection (e.g., to detect a change).

Based on receiving the input, the system can identify coordinate data (e.g., location data, pose data, orientation data, position data, etc.) associated with the sensor data identified by the input. For example, the system can identify a location of the robot (e.g., a location of a body, arm, sensor, leg, distal end of a leg, etc. of the robot) associated with the capture of the sensor data by the one or more sensors of the robot. In another example, the system can identify a location of the robot relative to one or more markers.

The system may identify a particular sensor of the robot associated with the input. For example, the system may identify a particular sensor of the robot that obtained a portion of sensor data identified by the input from a plurality of sensors of the robot. In some cases, the system may identify coordinate data associated with the sensor that obtained the portion of the sensor data identified by the input. In some embodiments, the system may identify a plurality of sensors of the robot associated with the input.

In some cases, the system can obtain the sensor data from a system in addition to or instead of the robot. For example, the system can obtain the sensor data from a user computing device. The system can identify coordinate data associated with the user computing device and the capture of a particular portion of sensor data (e.g., as identified by an input).

The system can associate a change detection with the coordinate data and the region of interest. For example, the system can associate a change detection with the coordinate data and the region of interest such that the change detection is performed using the region of interest based on a location, pose, orientation, position, etc. of the robot matching a location, pose, orientation, position, etc. identified by the coordinate data.

The system can associate a model (also referred to herein as a reference model) with the change detection. For example, the model may include a machine learning model, base sensor data (e.g., the particular portion of sensor data as identified by the input), a statistical model, etc. To perform the change detection, the system can compare obtained sensor data with the model to determine if a change has occurred and if an anomaly is present within the sensor data.

The system may instruct movement of the robot according to the coordinate data. For example, the system may instruct movement of the robot such that a location, pose, orientation, position, etc. of the robot matches a location, pose, orientation, position, etc. identified by the coordinate data. For example, the system may instruct navigation of the robot to a location within the environment based on the coordinate data. In another example, the system may instruct movement of the robot such that a position of the robot matches a position identified by the coordinate data. In some cases, the system May instruct iterative or simultaneous movement of the robot. For example, the system may instruct the robot to move to the location identified by the coordinate data and simultaneously to adjust to the position or pose identified by the coordinate data.

In some cases, the system may receive further input from a user computing device requesting navigation to the location. For example, the user computing device may provide movement controls to the system. The user computing device may obtain the input and route the input to the system and the system may route the input to the robot to instruct movement of the robot. In some cases, the system may transform, adjust, process, etc. the input prior to sending the input to the robot.

The system may determine that the location, pose, orientation, position, etc. of the robot matches the location, pose, orientation, position, etc. identified by the coordinate data. Based on determining the location, pose, orientation, position, etc. of the robot matches the location, pose, orientation, position, etc. identified by the coordinate data, the system may instruct the robot to obtain sensor data via a sensor of the robot.

In some cases, the system may instruct a particular sensor of the robot to obtain sensor data. As discussed above, the system may identify a particular sensor associated with the input (e.g., a sensor used to obtain the portion of sensor data identified by the input).

Based on instructing the robot to obtain sensor data, the system may obtain sensor data from the robot. The system may perform the change detection based on determining the location, pose, orientation, position, etc. of the robot matches the location, pose, orientation, position, etc. identified by the coordinate data. To perform the change detection, the system may analyze the sensor data using the model. For example, the system may analyze the sensor data using base sensor data identified by the model to detect one or more changes from the base sensor data to the sensor data.

Therefore, the system may perform a physical alignment of the robot (e.g., a pose, location, position, orientation, etc. of the robot). In some cases, in addition to or instead of the physical alignment of the robot, the system may perform image alignment (e.g., the system may align the obtained sensor data with sensor data from the model). The system may perform the image alignment prior to determining a difference score between the obtained sensor data and the sensor data from the model to detect changes. The system may perform the image alignment (e.g., a dense pixel-by-pixel alignment utilizing dense optic flow methods, an interpolated semi-dense alignment, or a template matching alignment) to identify pixel level variations, pixel patch level variations, etc. between the obtained sensor data and the sensor data from the model. The system may utilize sensor data not associated with the region of interest (e.g., outside of the region of interest) to perform the image alignment.

Based on the image alignment and a region of interest associated with the sensor data from the model, the system can identify a region of interest in the obtained sensor data. For example, the system can perform a search and alignment of the sensor data to identify the region of interest. The system can determine a difference score (e.g., in an illumination insensitive manner) for particular pixels and/or patches of pixels indicative of a difference in values of the pixels of the sensor data from the model and the obtained sensor data. The system can perform the change detection based on the determined difference score.

Based on performing the change detection, the system may detect a change. For example, the system may detect a change in a position of a lever, a change in an amount of liquid on a ground surface of the environment, a change in equipment in the environment, a change in the parameters of a door (e.g., an open door, a closed door, a partially open door, etc.).

Based on the detected change, the system may determine whether the detected change corresponds to an anomaly (e.g., the system may identify one or more anomalies within the sensor data). The system may identify anomaly data indicating how to identify anomalies. The anomaly data may indicate that particular changes are not anomalies and/or particular changes are anomalies. The anomaly data may indicate one or more parameters (e.g., types of changes, groups of changes, levels of changes, ranges of changes, etc.) for determination of an anomaly condition. For example, the anomaly data may indicate that changes in a first direction are not anomalies and changes in a second direction are anomalies, that a first type of changes (e.g., changes in orientation, pose, etc.) are not anomalies and a second type of changes (e.g., changes in location) are anomalies, that changes that correspond to less than a threshold portion of the region of interest are not anomalies and changes that correspond to or exceed the threshold portion of the region of interest are anomalies, etc.

In some cases, the anomaly data may indicate that a change in a position, orientation, location, or pose of an object, entity, structure, or obstacle if matching or within a threshold is not an anomaly and a change in a position, orientation, location, or pose of an object, entity, structure, or obstacle if exceeding a threshold is an anomaly. In some cases, the anomaly data may indicate that a first change in a position, orientation, location, or pose of an object, entity, structure, or obstacle is not an anomaly and a second change in a position, orientation, location, or pose of an object, entity, structure, or obstacle is an anomaly. For example, the anomaly data may indicate that turning a lever in a first direction is not an anomaly but turning a lever in a second direction is an anomaly, the anomaly data may indicate that a leak is an anomaly, the anomaly data may indicate that a first object not being present in the environment is not an anomaly but a second object not being present is the environment is an anomaly, the anomaly data may indicate that an object being present in the environment is an anomaly, etc. Therefore, the system may identify that a position, orientation, pose, location, etc. of an object, obstacle, structure, or entity within the environment has changed and identify such a change as an anomaly based on the anomaly data. In another example, the system may identify the presence or non-presence of an object, obstacle, structure, or entity within the environment as an anomaly.

In some cases, the anomaly data indicating what changes constitute an anomaly may be based on the location of the change (e.g., location specific), the user (e.g., user specific), the robot (e.g., robot specific), the time of day (e.g., time specific), the inspection mission (e.g., mission specific), the environment (e.g., environment specific), etc. For example, the anomaly data may indicate that a change in a position, orientation, location, or pose of an object, entity, structure, or obstacle in a first environment (or in a first location in the first environment) is not an anomaly and the change in a second environment (or in a second location in the second environment) is an anomaly)

Based on detecting a change and identifying an anomaly, the system may cause display of a user interface via the user computing device. For example, the display may identify the change, the anomaly, etc. In some cases, the system may receive further input from the user computing device accepting or rejecting the change or anomaly. The system may update the model based on the further input.

Accordingly, the teachings herein can be used to record a change detection during a mission by using sensor(s) of a robot to capture an image and choose one or more regions of interest of the image in which changes will be detected on subsequent mission playbacks. Additionally, changes detected in the regions of interest can be reported as anomalies, which can appear as live feedback (for example, pop-up alerts) and/or otherwise integrated with enterprise asset management software. To provide such change detection, newly captured inspection data may be compared, using a computer vision algorithm, to a model. The model can include one or more of a reference image, a collection of reference images from recording and/or previous mission runs, a statistical model encapsulating a set of reference images (for instance, a Gaussian mixture model), and/or a neural network trained via supervised learning.

Moreover, such a model can have baseline performance enhanced in a wide variety of ways. In one example, a user can flag a change detection result as good or bad (with or without other information such as bounding box annotations on images for identifying anomalies, if any), with such feedback used for retraining (for instance, incorporated into a neural network training set).

Figure 1B:
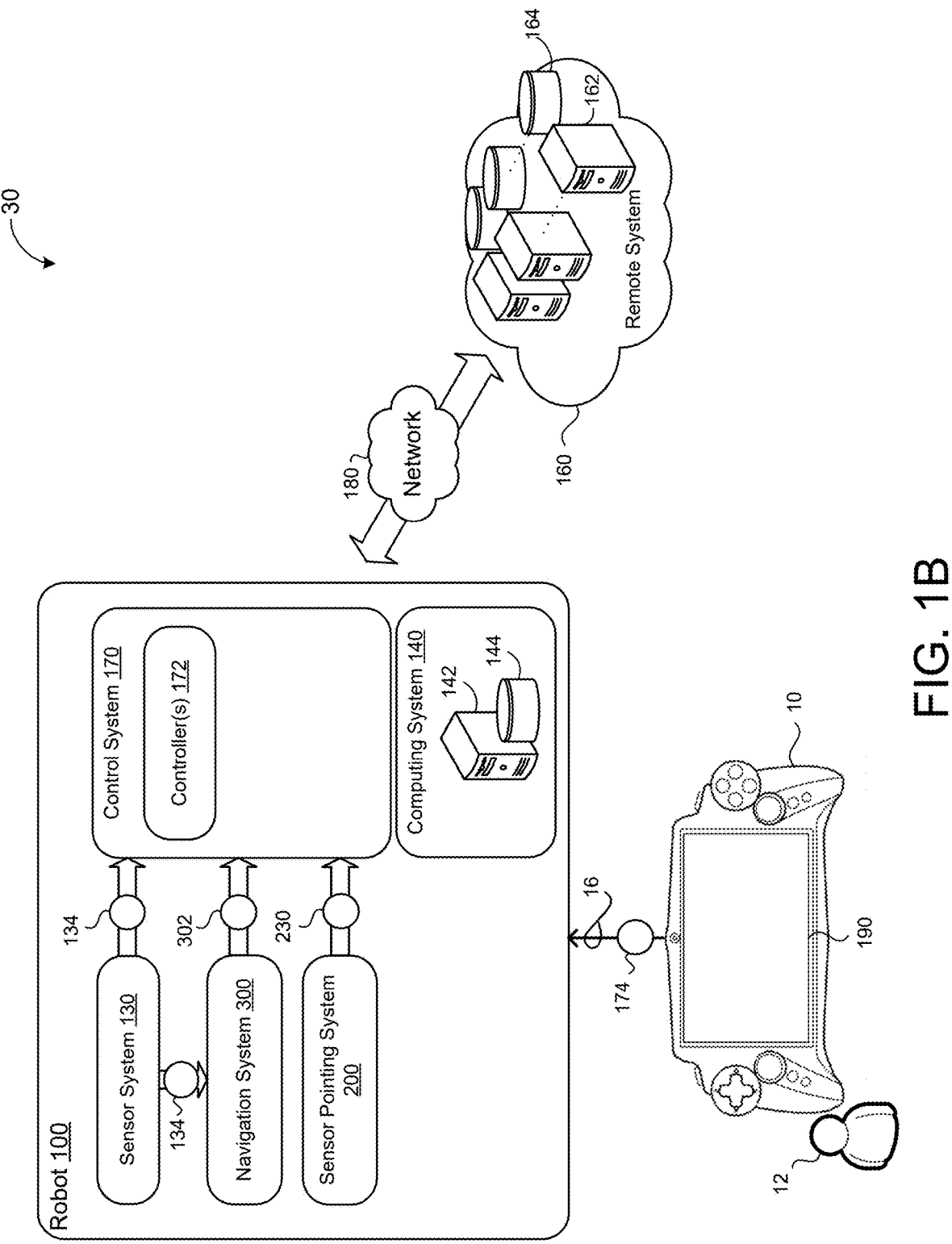
FIG. 1B is a schematic view of one embodiment of a sensor pointing system for pointing a sensor of the robot of FIG. 1A.

Referring to FIGS. 1A and 1B, in some implementations, a robot 100 includes a body 110 with one or more locomotion based structures such as legs 120a, 120b, 120c, and 120d coupled to the body 110 and that enable the robot 100 to move within the environment 30. In some examples, each leg is an articulable structure such that one or more joints J permit members 122 of the leg 120 to move. For instance, each leg includes a hip joint JH (for example, $J_H b$ and $J_H d$ of FIG. 1A) coupling an upper member 122, $122_U$ of the leg to the body 110 and a knee joint JK (for example, $J_{Ka}$, $J_{Kb}$, $J_{Kc}$, and $J_{kd}$ of FIG. 1A) coupling the upper member $122_U$ of the leg to a lower member $122_L$ of the leg. Although FIG. 1A depicts a quadruped robot with four legs 120a, 120b, 120c, 120d, the robot 100 may include any number of legs or locomotive based structures (e.g., a biped or humanoid robot with two legs, or other arrangements of one or more legs) that provide a means to traverse the terrain within the environment 30.

In order to traverse the terrain, each of the legs 120a, 120b, 120c, 120d has a distal end (for example, distal ends 124a, 124b, 124c, and 124d of FIG. 1A) that contacts a surface of the terrain (i.e., a traction surface). In other words, the distal end of each leg is the end of the leg used by the robot 100 to pivot, plant, or generally provide traction during movement of the robot 100. For example, the distal end of a leg corresponds to a foot of the robot 100. In some examples, though not shown, the distal end of the leg includes an ankle joint such that the distal end is articulable with respect to the lower member 1221 of the leg.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., also referred to as an end-effector). Here, the lower member $128_L$, may rotate or pivot about a first arm joint $J_{A1}$ located adjacent to the body 110 (e.g., where the arm 126 connects to the body 110 of the robot 100). The lower member $128_L$ is also coupled to the upper member $128_U$ at a second arm joint $J_{A2}$, while the upper member $128_U$ is coupled to the hand member $128_H$ at a third arm joint $J_{A3}$.

In some examples, such as in FIG. 1A, the hand member $128_H$ is a mechanical gripper that includes a moveable jaw and a fixed jaw configured to perform different types of grasping of elements within the environment 30. In the example shown, the hand member $128_H$ includes a fixed first jaw and a moveable second jaw that grasps objects by clamping the object between the jaws. The moveable jaw is configured to move relative to the fixed jaw to move between an open position for the gripper and a closed position for the gripper (e.g., closed around an object).

In some implementations, the arm 126 additionally includes a fourth joint $J_{A4}$. The fourth joint $J_{A4}$ may be located near the coupling of the lower member $128_L$ to the upper member $128_U$ and functions to allow the upper member $128_U$ to twist or rotate relative to the lower member $128_L$. In other words, the fourth joint $J_{A4}$ may function as a twist joint similarly to the third joint $J_{A3}$ or wrist joint of the arm 126 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. In some configurations, the socket is configured as a connector such that the arm 126 attaches or detaches from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120a, 120b, 120c, 120d relative to the body 110 alters the pose P of the robot 100 (i.e., the combination of the position of the CM of the robot and the attitude or orientation of the robot 100). Here, a height generally refers to a distance along the z-direction (e.g., along the z-direction axis $A_Z$). The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 14 where distal ends 124a, 124b, 124c, 124d of the legs 120a, 120b, 120c, 120d of the robot 100 may generate traction to help the robot 100 move within the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 30 or to perform tasks using the arm 126, the robot 100 includes a sensor system with one or more sensors. For example, FIG. 1A illustrates a first sensor 132a mounted at a front of the robot 100 (i.e., near a front portion of the robot 100 adjacent the front legs 120a and 120b), a second sensor 132b mounted near the hip of the second leg 120b of the robot 100, a third sensor 132c corresponding to one of the sensors mounted on a side of the body 110 of the robot 100, a fourth sensor 132d mounted near the hip of the fourth leg 120d of the robot 100, and a fifth sensor 132e mounted at or near the hand member 128$_H$ of the arm 126 of the robot 100. The sensors may include vision/image sensors, inertial sensors (e.g., an inertial measurement unit (IMU)), force sensors, and/or kinematic sensors. Some examples of sensors include a camera such as a stereo camera a visual red-green-blue (RGB) camera, or a thermal camera, a time-of-flight (TOF) sensor, a scanning light-detection and ranging (LIDAR) sensor, or a scanning laser-detection and ranging (LADAR) sensor. Other examples of sensors include microphones, radiation sensors, and chemical or gas sensors.

In some examples, the sensor has a corresponding field(s) of view $F_V$ defining a sensing range or region corresponding to the sensor. For instance, FIG. 1A depicts a field of a view $F_V$ for the robot 100. Each sensor may be pivotable and/or rotatable such that the sensor, for example, changes the field of view $F_V$ about one or more axis (e.g., an x-axis, a y-axis, or a z-axis in relation to a ground plane). In some examples, multiple sensors may be clustered together (e.g., similar to the first sensor 132a) to stitch a larger field of view $F_V$ than any single sensor. With sensors placed about the robot 100, the sensor system may have a 360 degree view or a nearly 360 degree view (with respect to the X-Y or transverse plane) of the surroundings of the robot 100.

When surveying a field of view $F_V$ with a sensor, the sensor system generates sensor data 134 (e.g., image data) corresponding to the field of view $F_V$. The sensor system may generate the field of view $F_V$ with a sensor mounted on or near the body 110 of the robot 100 (e.g., sensor(s) 132a, 132b). The sensor system may additionally and/or alternatively generate the field of view $F_V$ with a sensor mounted at or near the hand member 128$_H$ of the arm 126 (e.g., sensor(s) 132e). The one or more sensors capture the sensor data 134 that defines the three-dimensional point cloud for the area within the environment 30 of the robot 100. In some examples, the sensor data 134 is image data that corresponds to a three-dimensional volumetric point cloud generated by a three-dimensional volumetric image sensor. Additionally or alternatively, when the robot 100 is maneuvering within the environment 30, the sensor system gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100. In other words, the sensor system may communicate the sensor data 134 from one or more sensors to any other system of the robot 100 in order to assist the functionality of that system.

In some implementations, the sensor system includes sensor(s) coupled to a joint J. Moreover, these sensors may couple to a motor M that operates a joint J of the robot 100 (e.g., sensors 132b, 132c, 132d). Here, these sensors generate joint dynamics in the form of joint-based sensor data 134. Joint dynamics collected as joint-based sensor data 134 may include joint angles (e.g., an upper member 122 relative to a lower member 1221, or hand member 128$_H$ relative to another member of the arm 126 or robot 100), joint speed, joint angular velocity, joint angular acceleration, and/or forces experienced at a joint J (also referred to as joint forces). Joint-based sensor data generated by one or more sensors may be raw sensor data, data that is further processed to form different types of joint dynamics, or some combination of both. For instance, a sensor measures joint position (or a position of member(s) 122 coupled at a joint J) and systems of the robot 100 perform further processing to derive velocity and/or acceleration from the positional data. In other examples, a sensor is configured to measure velocity and/or acceleration directly.

As the sensor system gathers sensor data 134, a computing system 140 stores, processes, and/or to communicates the sensor data 134 to various systems of the robot 100 (e.g., the control system 170, a sensor pointing system 200, a navigation system 300, and/or remote controller 10, etc.). In order to perform computing tasks related to the sensor data 134, the computing system 140 of the robot 100 (which is schematically depicted in FIG. 1A and can be implemented in any suitable location(s), including internal to the robot 100) includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (e.g., in a single location/area on the robot 100, for example, the body 110 of the robot 100), decentralized (e.g., located at various locations about the robot 100), or a hybrid combination of both (e.g., including a majority of centralized hardware and a minority of decentralized hardware). To illustrate some differences, a decentralized computing system 140 may allow processing to occur at an activity location (e.g., at motor that moves a joint of a leg) while a centralized computing system 140 may allow for a central processing hub that communicates to systems located at various positions on the robot 100 (e.g., communicate to the motor that moves the joint of the leg).

Additionally or alternatively, the computing system 140 can utilize computing resources that are located remote from the robot 100. For instance, the computing system 140 communicates via a network 180 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In additional examples, the computing system 140 is configured to utilize the remote resources 162, 164 as extensions of the computing resources 142, 144 such that resources of the computing system 140 reside on resources of the remote system 160.

In some implementations, as shown in FIG. 1B, the robot 100 includes a control system 170. The control system 170 may be configured to communicate with systems of the robot 100, such as the at least one sensor system 130, the navigation system 300 (e.g., with navigation commands 302), and/or the sensor pointing system 200 (e.g., with body pose commands 230). The control system 170 may perform operations and other functions using the computing system 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one the controller 172 may be responsible for controlling movement of the arm 126 of the robot 100 in order for the arm 126 to perform various tasks using the hand member $128_H$. For instance, at least one controller 172 controls the hand member $128_H$ (e.g., a gripper) to manipulate an object or element in the environment 30. For example, the controller 172 actuates the movable jaw in a direction towards the fixed jaw to close the gripper. In other examples, the controller 172 actuates the movable jaw in a direction away from the fixed jaw to close the gripper.

A given controller 172 may control the robot 100 by controlling movement about one or more joints J of the robot 100. In some configurations, the given controller 172 is software or firmware with programming logic that controls at least one joint J and/or a motor M which operates, or is coupled to, a joint J. A software application (i.e., a software resource) may refer to computer software that causes a computing device to perform a task. In some examples, a software application may be referred to as an "application," an "app," or a "program." For instance, the controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators or motors M, the controller 172 may coordinate movement for all different parts of the robot 100 (e.g., the body 110, one or more of the legs 120a, 120b, 120c, 120d, the arm 126). For example, to perform a behavior with some movements, a controller 172 may be configured to control movement of multiple parts of the robot 100 such as, for example, two legs 120a, 120b, four legs 120a, 120b, 120c, 120d, or two legs 120a, 120b combined with the arm 126. In some examples, a controller 172 is configured as an object-based controller that is setup to perform a particular behavior or set of behaviors for interacting with an interactable object.

With continued reference to FIG. 1B, an operator 12 (also referred to herein as a user or a client) may interact with the robot 100 via the remote controller 10 that communicates with the robot 100 to perform actions. For example, the operator 12 transmits commands 174 to the robot 100 (executed via the control system 170) via a wireless communication network 16. Additionally, the robot 100 may communicate with the remote controller 10 to display an image on a user interface 190 of the remote controller 10. For example, the user interface 190 is configured to display the image that corresponds to three-dimensional field of view $F_V$ of the one or more sensors. The image displayed on the user interface 190 of the remote controller 10 is a two-dimensional image that corresponds to the three-dimensional point cloud of sensor data 134 (e.g., field of view $F_V$) for the area within the environment 30 of the robot 100. That is, the image displayed on the user interface 190 may be a two-dimensional image representation that corresponds to the three-dimensional field of view $F_V$ of the one or more sensors.

Figure 2:
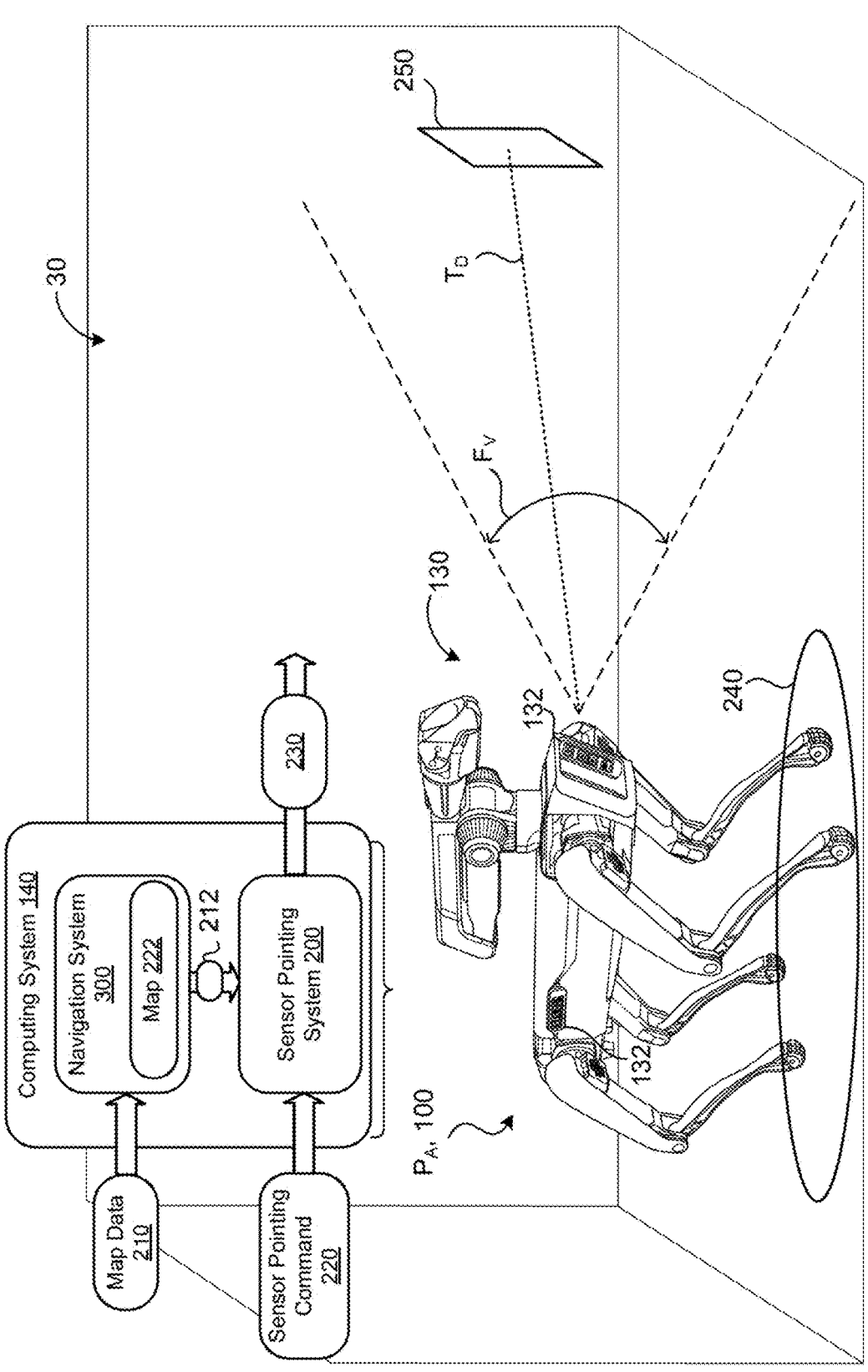
FIG. 2 is a schematic view of a robot with a sensor pointing system according to one embodiment.

In some implementations, as shown in FIG. 2, the robot 100 is located in the environment 30 and is equipped with the sensor system 130 that includes the sensor 132 (disposed on the body 110, in this example) on the robot 100 and having a field of view $F_V$ that includes at least a portion of the environment 30 surrounding the robot 100. The computing system 140 of the robot 100 is equipped with data processing hardware and memory hardware with the memory hardware including instructions to be executed by the data processing hardware. The computing system 140 is configured to operate the navigation system 300 and the sensor pointing system 200 (for instance, in autonomous inspection applications) to navigate the robot 100 to a POI and uses a sensor 132 to capture sensor data 134 at the POI in a particular way all without user input or supervision.

In the illustrated embodiment, the computing system 140 includes the navigation system 300 that generates or receives a map 222 (e.g., a navigation map, a graph map, etc.) from map data 210 obtained by the computing system 140. The navigation system 300 generates a navigation route 212 (e.g., a route, a route path, etc.) that plots a path around large and/or static obstacles from a start location (e.g., the current location of the robot 100) to a destination. The navigation system 300 is in communication with the sensor pointing system 200. The sensor pointing system 200 may receive the navigation route 212 or other data from the navigation system 300 in addition to sensor data 134 from the sensor system 130.

The sensor pointing system 200 receives a sensor pointing command 220 (e.g., from the user 12) that directs the robot 100 to capture sensor data 134 of a target location 250 (e.g., a specific area or a specific object in a specific area) and/or in a target direction $T_D$. The sensor pointing command 220 may include one or more of the target location 250, the target direction $T_D$, an identification of a sensor 132 (or multiple sensors) to capture sensor data 134 with, etc. When the robot is proximate the target location, the sensor pointing system 200 generates one or more body pose commands 230 (e.g., to the control system 170) to position the sensor 132 such that the target location 250 and/or the target direction $T_D$ are within the field of sensing of the sensor 132. For example, the sensor pointing system 200 determines necessary movements of the sensor 132 and/or of the robot 100 (i.e., adjust a position or orientation or pose P of the robot) to align the field of sensing of the sensor 132 with the target location 250 and/or target direction $T_D$.

In some examples, and as discussed in more detail below, the sensor pointing system 200 directs the pose P of the robot 100 to compensate for a sensed error in sensor 132 configuration or orientation. For example, the robot 100 may alter its current pose P to accommodate a limited range of motion of the field of view $F_V$ of the sensor, avoid occluding the captured sensor data, or match a desired perspective of the target location 250. Thus, in some implementations, the sensor pointing system 200, based on an orientation of the sensor 132 relative to the target location 250, determines the target direction $T_D$ to point the sensor 132 toward the target location 250.

Alternatively or additionally, the sensor pointing system determines an alignment pose $P_A$ of the robot to cause the sensor 132 to point in the target direction $T_D$ toward the target location 250. The sensor pointing system 200 may command the robot 100 to move to the alignment pose $P_A$ to cause the sensor 132 to point in the target direction $T_D$. After the robot 100 moves to the alignment pose $P_A$, and with the sensor 132 pointing in the target direction $T_D$ toward the target location 250, the sensor pointing system 200 may command the sensor 132 to capture sensor data 134 of the target location 250 in the environment 30.

In other words, the computing system 140 is configured to receive the sensor pointing command 220 (e.g., from the user 12) that, when implemented, commands the robot 100 to capture sensor data 134 using the sensor 132 (or multiple sensors) disposed on the robot 100. Based on the orientation of the sensor 132 relative to the target location 250, the sensor pointing system 200 determines the target direction $T_D$ and the alignment pose P of the robot 100. The determined target direction $T_D$ points the sensor 132 toward the target location 250 and the determined alignment pose $P_A$ of the robot 100 causes the sensor 132 to point in the target direction $T_D$ toward the target location 250. The sensor pointing system 200 may command the robot 100 to move from a current pose P of the robot 100 to the alignment pose $P_A$ of the robot. After the robot 100 moves to the alignment pose $P_A$ and with the sensor 132 pointing in the target direction $T_D$ toward the target location 250, the sensor pointing system 200 commands the sensor 132 to capture sensor data 134 of the target location 250 in the environment 30.

As will become apparent from this disclosure, the sensor pointing system 200, along with other features and elements of the methods and systems disclosed herein, make the data capture of target locations 250 in environments 30 repeatable and accurate as the robot 100 is sensitive to sensed and unsensed error in the robot's position, orientation, and sensor configuration. The sensor pointing system 200 allows the robot 100 to overcome odometry and sensor error when capturing sensor data 134 relative to the target location 250 at least in part by determining the target direction $T_D$ for pointing the sensor 132 at the target location 250 and the alignment pose $P_A$ for achieving the target direction $T_D$ based on the orientation of the sensor 132 relative to the target location 250.

In some examples, in response to receiving the sensor pointing command 220, the sensor pointing system 200 commands the robot 100 to navigate to a target point of interest (POI) 240 within the environment 30. In such examples, the sensor pointing system 200 determines the target direction $T_D$ and the alignment pose $P_A$ of the robot 100 after the robot 100 navigates to the target POI 240.

Figure 3:
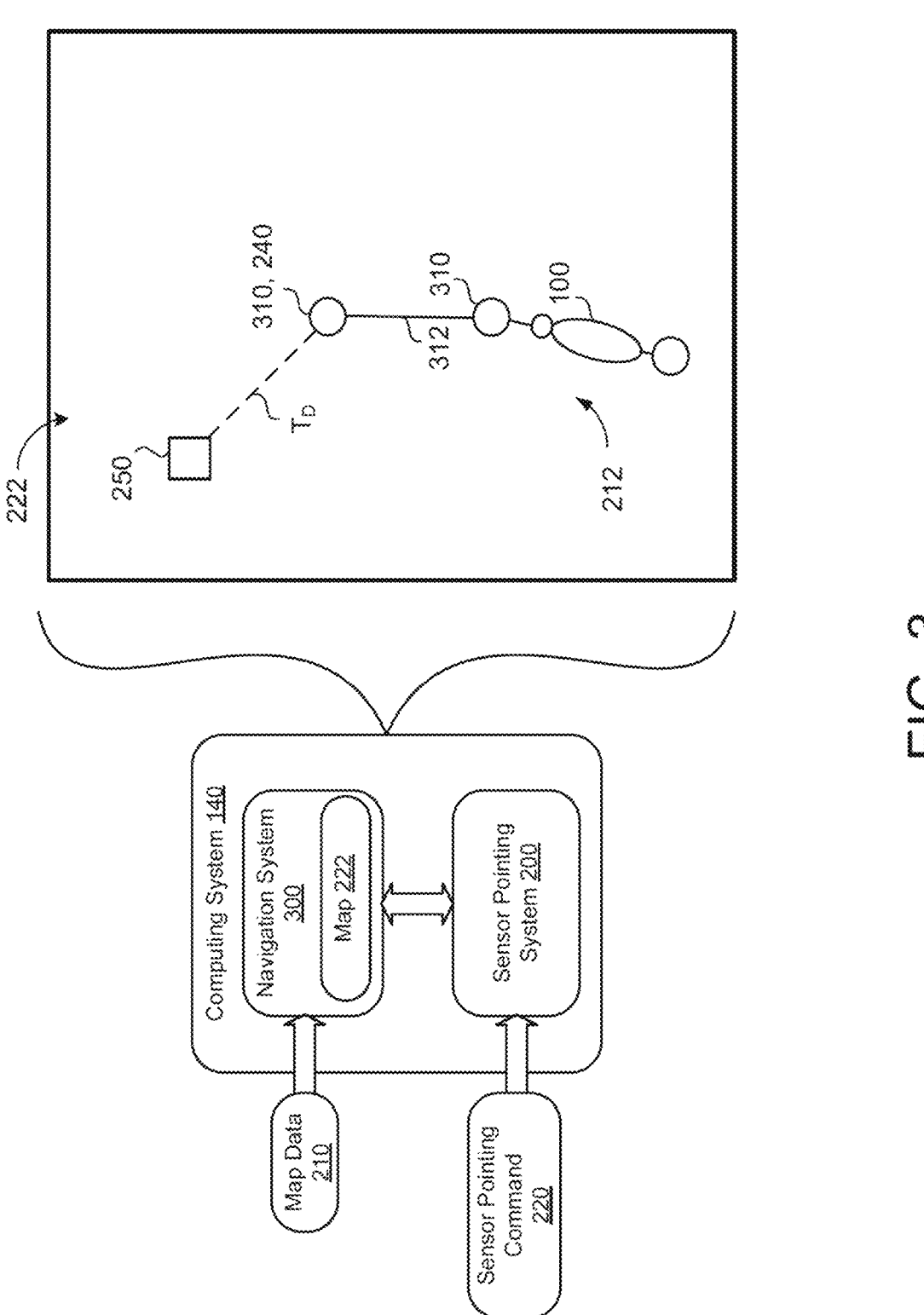
FIG. 3 is a schematic view of a robot navigating to a point of interest to capture sensor data according to one embodiment.

Referring now to FIG. 3, in some examples, the navigation system 300 (e.g., based on map data 210, sensor data 134, etc.) generates a series of route waypoints 310 on the map 222 for the navigation route 212 that plots a path around large and/or static obstacles from a start location (e.g., the current location of the robot 100) to a destination (e.g., the target POI 240). Route edges 312 connect corresponding pairs of adjacent route waypoints 310. The robot 100, when navigating the environment 30, travels from route waypoint 310 to route waypoint 310 by traversing along the route edges 312. In some examples, the target POI 240 is a route waypoint 310 on the map 222. In the example shown, the robot 100 travels along the navigation route 212 until reaching the target POI 240 (i.e., a specified route waypoint 310). In some examples, the target POI 240 is the final route waypoint 310 along the navigation route 212, while in other examples, the navigation route 212 continues on with additional route waypoints 310 and route edges 320 for the robot 100 to continue along after capturing the sensor data 134 at the target POI 240 and the navigation route 212 may include any number of target POIs 240 for capturing sensor data 134 at various locations along the navigation route 212.

Thus, based on guidance provided by the navigation system 300, the robot 100 arrives at a route waypoint 310 defined by the target POI 240. After arrival at the waypoint, the sensor pointing system 200 may determine an orientation of the sensor relative to the target location 250. Based on the orientation of the sensor relative to the target location 250, the sensor pointing system 200 determines the target direction $T_D$ for pointing the sensor toward the target location 250.

Figure 4:
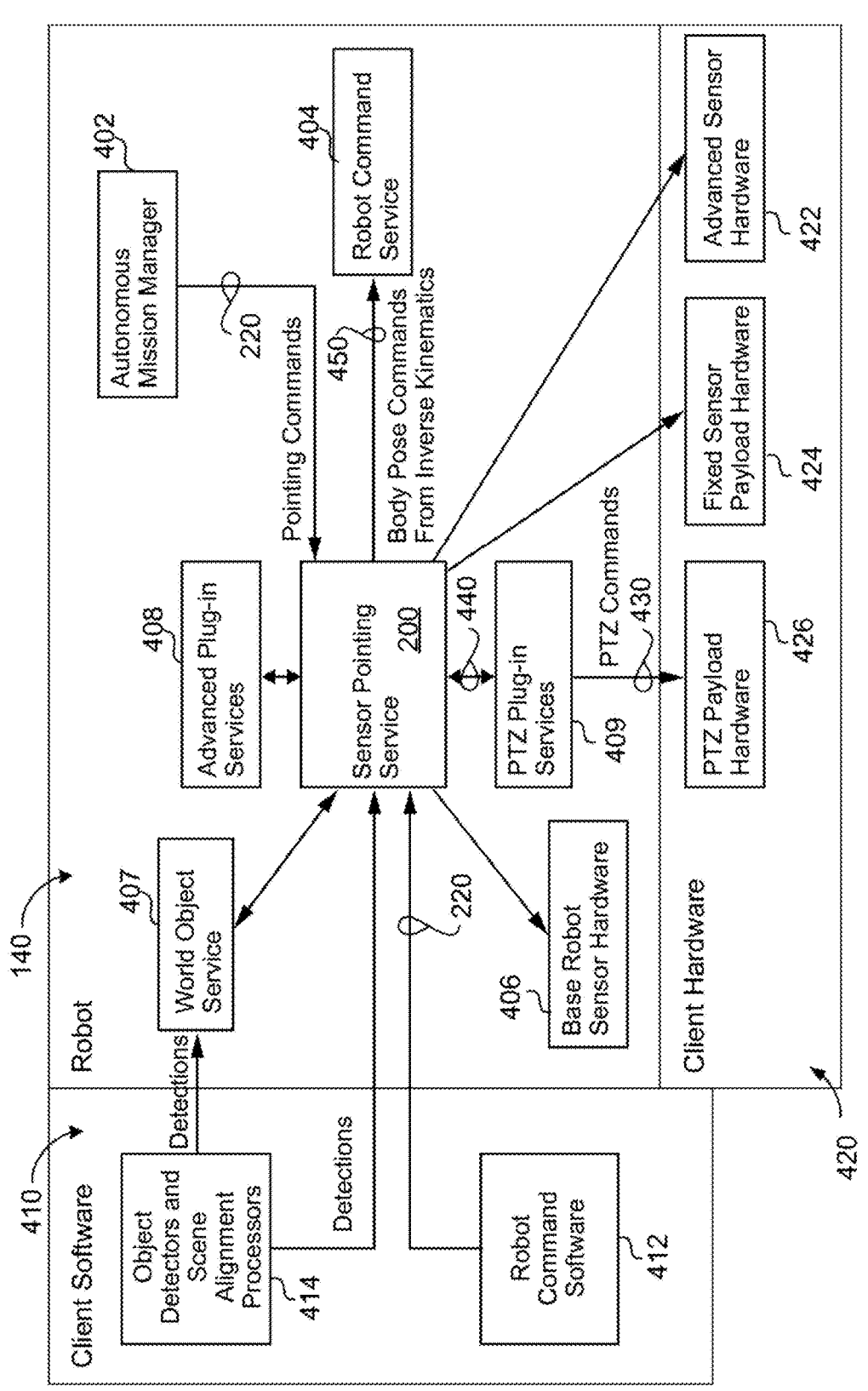
FIG. 4 is a schematic view of a sensor pointing system according to one embodiment.

Although examples herein (e.g., FIG. 2) illustrate the sensor integrated into the body of the robot 100 at a front portion of the robot 100 with a field of view $F_V$ primarily forward of the robot, the sensor (or sensors) may be disposed in any suitable manner on the robot 100. The sensor may include any number of different types of sensors such as a camera, LIDAR, and/or microphone. For example, the sensor may be built into the body 110 of the robot 100 or attached as a payload. In some examples, the sensor is disposed on the articulated arm 126. Additionally, the sensor may be permanently fixed to the robot 100 as part of its original manufacture or alternatively disposed or mounted at the robot 100 (e.g., client hardware) and connected to the sensor pointing system 200 via client software (FIG. 4). The sensor may have any fixed or pivotable (e.g., a pan-tilt-zoom (PTZ) sensor such as a PTZ camera) field of view/field of sensing. Because the orientation of the sensor is based at least in part on the pose P of the robot 100, movement of the robot 100, such as to the alignment pose $P_A$, changes the field of view of the sensor.

The target direction $T_D$, in some examples, is parameterized by the sensor pointing command 220. In other words, the sensor pointing command 220 may include instructions as to how the sensor data 134 of the target location 250 should be captured, such as from a certain direction, angle, zoom, focus, and/or distance relative to the target location 250 or with the target location 250 framed a certain way in the field of view $F_V$ of the sensor. Thus, the sensor pointing command 220 may include parameters for capturing sensor data 134 of the target location 250, such as angle, height, proximity, and direction of the sensor relative to the target location, and parameters related to placement of the target location 250 within the captured sensor data 134. The parameters may also include configuration for the sensor while capturing the sensor data 134 (e.g., zoom, focus, exposure, control of illumination sources, etc.). The sensor pointing system 200 may determine the target direction $T_D$ based on the parameters of the sensor pointing command 220. Alternatively, the target direction $T_D$ may be provided by the sensor pointing command 220. Based on the parameters of the sensor pointing command 220 and/or the target direction $T_D$, the sensor pointing system 200 commands the robot 100 (e.g., to the alignment pose $P_A$) and/or sensor to move to orient the sensor toward the target location 250.

Referring now to FIGS. 1B and 4, the sensor pointing system 200 may determine the target direction $T_D$ and the alignment pose $P_A$ in response to receiving the sensor pointing command 220. The sensor pointing command 220 may originate from an onboard autonomous mission manager 402 (i.e., generated from mission data or parameters, robot configuration, etc.) and/or from client software 410 that includes robot command software 412. Thus, the user 12 may communicate sensor pointing commands 220 to the robot (e.g., wirelessly via the controller 10) or robot 100 may generate the sensor pointing command(s) within the context of an autonomous mission. Here, the sensor pointing system 200 includes a sensor pointing service. The sensor pointing commands 220 are communicated to the sensor pointing service (e.g., by the autonomous mission manager 402 or the robot command software 412) to determine the target direction $T_D$ and sensor configurations for capturing the sensor data 134.

In some implementations, the client software 410 (in communication with the computing system 140 of the robot 100) includes object detectors and scene alignment processors 414 that process the sensor data 134 captured by the sensor. For example, the object detectors detect objects present in captured image data. In other implementations, the sensor pointing system 200 includes the object detectors and/or scene alignment processors and processes the sensor data 134 automatically. The client software 410 may execute locally at the robot 100 or may execute remote from the robot 100 (e.g., at the controller 10, the remote system 160, or at any other server exterior the robot 100 and in communication with the computing system 140 of the robot 100).

The sensor pointing system 200 may also be in communication with the mechanical systems of the robot 100. For example, as shown in FIG. 4, the sensor pointing system 200 may communicate the body pose commands 230 to a robot command service 404 of the computing system 140, and various sensors disposed at or in communication with the robot 100, such as base robot sensor hardware 406, advanced plug-in sensors 408, and client hardware 420. For example, the client hardware 420, includes advanced sensor hardware 422, fixed sensor hardware 424, and a pan-tilt-zoom (PTZ) sensor payload 426 at the robot 100. In certain implementations, the robot 100 can be instructed to move in multiple command ways, including both map navigation and robot commands.

In some implementations, the PTZ payload hardware 426 (e.g., a sensor) communicates with PTZ plug-in services 409 at the robot which is operable to, for example, receive sensor data 134 from the PTZ payload hardware 426 and communicate PTZ commands 430 to the PTZ payload hardware 426. The PTZ plug-in service 409 may be sensor specific (i.e., a hardware interface) and thus likely to execute client-side (i.e., external to the robot 100). In some examples, the PTZ plug-in services 409 execute within the sensor. In some implementations, the PTZ payload hardware 426 is a sensor (e.g., a PTZ camera) temporarily mounted to or connected with the robot 100. The sensor pointing system 200 may delegate reconfiguration of the PTZ payload hardware 426 to the PTZ plug-in 409.

When the robot includes a PTZ sensor, and after the system obtains or determines the target direction $T_D$ for pointing the PTZ sensor toward the target location 250, the sensor pointing system 200 may sense or detect and correct any existing error (i.e., discrepancy) between the current direction of the PTZ sensor (e.g., a vector along the center of the field of sensing of the PTZ sensor) and the target direction $T_D$. The center of the field of sensing refers to a vector that originates at the PTZ sensor and extends away from the PTZ sensor such that the sensor's field of sensing to the left and to the right of the vector are of equivalent size and the sensor's field of sensing above and below the vector are of equivalent size.

In such implementations, the sensor pointing system 200 determines whether the center of a field of sensing of the PTZ sensor (or other sensor) is aligned with the target direction $T_D$ and, if the center of field of sensing, (i.e., the "aim") of the PTZ sensor is not aligned with the target direction $T_D$, the sensor pointing system 200 determines PTZ alignment parameters for aligning the center of the field of sensing of the PTZ sensor with the target direction $T_D$. Furthermore, the sensor pointing system 200 may command the PTZ sensor, e.g., using the PTZ alignment parameters, to adjust the center of the field of sensing of the PTZ sensor (e.g., commanding the PTZ sensor to pan, tilt, and/or zoom) to align with the target direction $T_D$. Thus, the target direction $T_D$ may be parameterized, at least in part, by PTZ alignment parameters.

In some implementations, after commanding the PTZ sensor to adjust the center of the field of sensing of the PTZ sensor, the sensor pointing system 200 receives, from the PTZ sensor (e.g., via the PTZ plug-in services 409), alignment feedback data 440. The alignment feedback data 440 indicates the current PTZ parameters of the PTZ sensor. That is, the alignment feedback data 440 indicates the current orientation of the PTZ sensor relative to the pose P of the robot 100. In some examples, the sensor pointing system 200 determines a difference, based on the alignment feedback data 440, between the current alignment 510 (FIG. 5) of the center of the field of sensing of the PTZ sensor and the target direction $T_D$. When there is a difference (e.g., above a threshold difference), the sensor pointing system 200 determines, based on the difference between the current alignment of the center of the field of sensing of the PTZ sensor and the target direction $T_D$, the alignment pose $P_A$ that will correct the difference between the pointing direction of the PTZ sensor and the target direction $T_D$. Thus, in these examples, determining the alignment pose $P_A$ of the robot 100 is based on the received alignment feedback data 440 from the PTZ sensor. In other examples, such as when the sensor is fixed, alignment of the sensor relies entirely on the alignment post $P_A$ of the robot 100.

Figure 5:
FIG. 5 is a schematic view of a robot executing a sensor pointing command on a detected object according to one embodiment.
Figure 5:
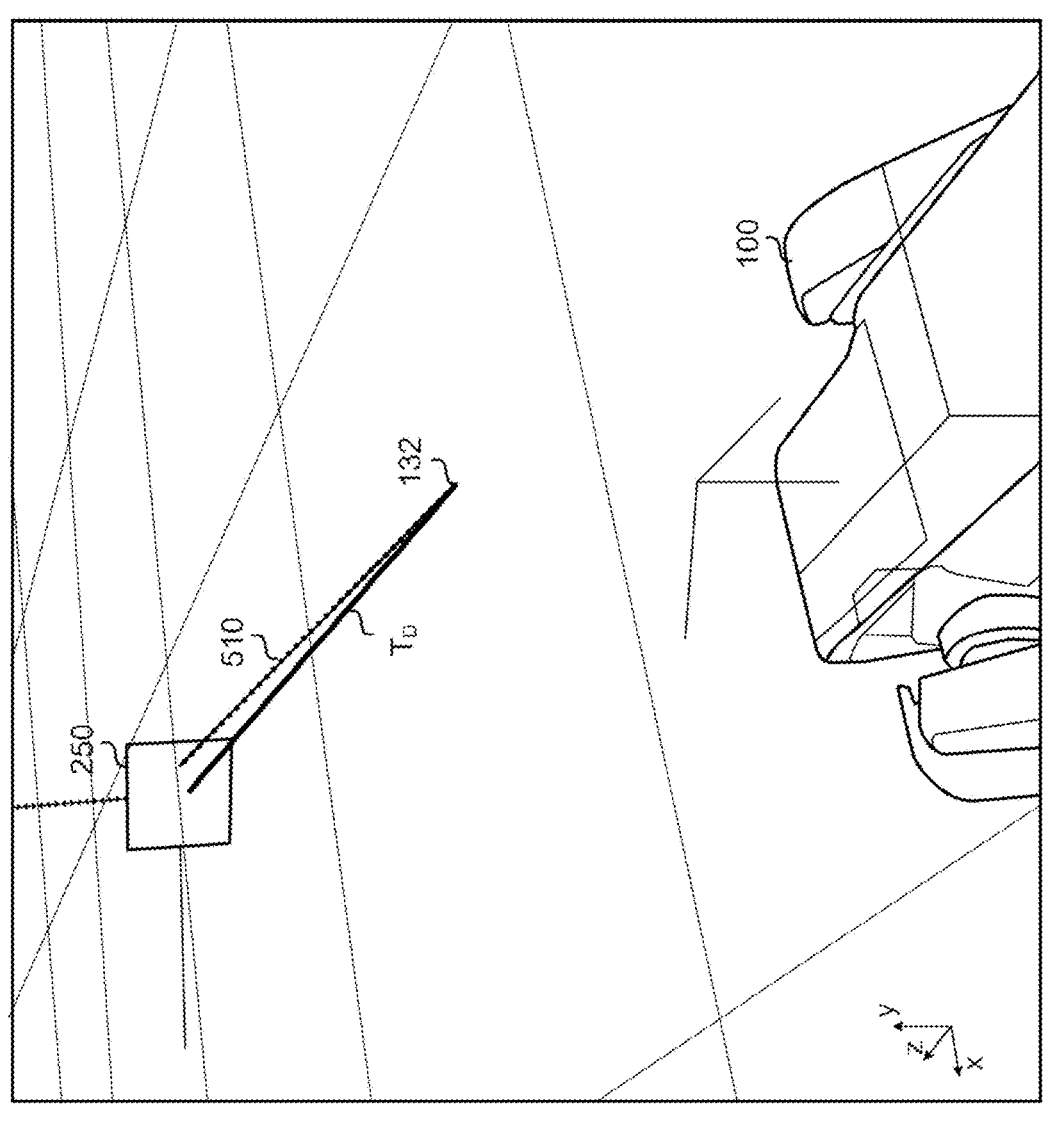

Referring now to FIG. 5, a schematic view 500 includes a three dimensional (3D) representation of a portion of the robot 100 and the target location 250. Here, the sensor pointing system 200 has commanded the sensor 132 (e.g., a PTZ sensor) to align with the target direction $T_D$, however, the alignment feedback data 440 from the sensor 132 indicates a difference or error between a current alignment 510 of the sensor 132 (i.e., and adjusted center of the field of sensing) and the target direction $T_D$, where the target direction $T_D$ and the current alignment 510 are represented by respective vectors to the target location 250 and originating at the sensor 132. For example, the alignment error can arise from a variety of sources, for instance, the sensor 132 encountered a failure or the commanded orientation would require the sensor 132 to move beyond its capabilities (i.e., insufficient range of motion) or the field of sensing may be occluded by a portion of the sensor 132 itself or a portion of the robot 100. Based on the error or difference or discrepancy between the current alignment 510 of the sensor 132 and the target direction $T_D$, the sensor pointing system 200 determines an alignment pose $P_A$ for the robot 100 that will adjust the orientation of the sensor 132 such that the sensor will point at the target location 250 in the target direction $T_D$. Thus, the initial alignment of the sensor 132 and alignment feedback data 440 from the sensor 132 indicating the error between the current alignment 510 and the target direction $T_D$, in this example, results in the sensor pointing system 200 determining the alignment pose $P_A$ for pointing the sensor 132 at the target location 250 in the target direction $T_D$. The sensor pointing system 200 may command the robot 100 to move the current pose P to the determined alignment pose $P_A$ prior to capturing sensor data 134 with the sensor 132.

The sensor pointing command 220 may parameterize the target direction $T_D$ in other manners to capture the desired sensor data 134 of the target location 250. For example, the sensor pointing command 220 may parameterize the target direction $T_D$ as a selected direction, a selected ray or vector (e.g., that originates from the robot 100 or the sensor 132), or based on a point relative to one of any known coordinate frames of the robot 100. In such implementations, the sensor pointing command 220 may include a user input indication indicating selection of a ray or a point relative to a known coordinate frame of the robot 100. The user input indication may constitute the target location 250 and the sensor pointing system may determine the target direction $T_D$ and/or the alignment pose $P_A$ of the robot 100 to point or aim the sensor 132 in such a way that the user input indication is at the center of the field of view of the sensor 132.

In some implementations, the sensor pointing command 220 parameterizes the target direction $T_D$ based on object detection capabilities of the robot 100, such as enabled by an object data base or world object service 407 (FIG. 4) of the computing system 140 of the robot 100. The object database 407 stores objects that the robot 100 has previously detected or may receive detection information from object detectors 414 of the client software 410. Object detection may be performed by any system remote or local to the robot 100. For example, the computing system 140 may receive object detection indications from the client software 410 or may receive object detections or perform object detection at the world object service portion 407 of the computing system 140. Additionally, the sensor pointing system 200 may determine the target direction $T_D$ based on the orientation of the sensor 132 relative to the target location 250 based at least in part on detecting an object that is at, near, or defines the target location 250. In these examples, the target direction $T_D$ may be based on an aspect or feature of the detected object.

In some examples, the sensor pointing command 220 may parameterize the target direction $T_D$ via a two dimensional (2D) or 3D model of an object in an object database or world object service 407 of the computing system 140 of the robot 100 (FIG. 4). In this scenario, the model of the object defines the target location 250 or is at or near the target location 250 in the environment. For example, the sensor pointing command 220 includes a model of an object that is to be detected and the target direction $T_D$ is intended to point the sensor 132 at a particular portion of the detected object or to point the sensor 132 in a particular orientation relative to the detected object.

In some examples, before aligning the sensor 132 in the target direction $T_D$ to capture sensor data 134 of the target location 250, the sensor pointing system 200 captures image data 134 of the environment 30 using a camera 132. Using the provided model of the object, the sensor pointing system 200 determines whether the object is present in the captured image data 134. When the object is present in the captured image data 134, the sensor pointing system 200 may determine the target direction $T_D$ relative to the detected object. For example, the determined target direction $T_D$ may center the object within a field of view $F_V$ of the sensor 132. In some examples, the sensor 132 is controllable to move relative to the body of the robot such that the sensor 132 adjusts to align the sensor 132 in the target direction $T_D$ in combination with, or without, changing the pose of the robot 100.

In some examples, the sensor pointing command 220 parameterizes the target direction $T_D$ via an object classification of an object to be detected. In such examples, the sensor pointing command 220 includes an object classification. The object classification is an output of the object detector that matches detected objects to corresponding classifications. Thus, the sensor pointing command 220 may include a category or classification of object(s) to be detected, and the sensor pointing command 220 is parameterized relative to the indicated classification.

In certain implementations, before aligning the sensor 132 in the target direction $T_D$ to capture sensor data 134 of the target location 250, the sensor pointing system 200 captures image data 134 of the environment 30 using the sensor 132. The sensor pointing system 200 processes the captured image data 134 to detect an object and determines a classification of the detected object. Using the output of the object detector, the sensor pointing system 200 determines whether the classified object is present in the captured image data 134. When the classified object is present in the captured image data 134, the sensor pointing system 200 determines the target direction $T_D$ of the sensor 132 relative to the classified object. For example, the sensor pointing system 200 determines the target direction $T_D$ to center the classified object within a field of view $F_V$ of the sensor 132.

Thus, when the robot 100 is in the environment 30, the sensor pointing system 200 may perform object detection to determine whether an object is present in the environment 30 and whether the detected object matches a model of an object or a classification of an object provided to the system.

The sensor pointing system 200 may scan a portion of the environment (e.g., based on parameters in the sensor pointing command 220 such as a requested direction) in an attempt to acquire the location of the object. When the modeled object or classified object is present, the sensor pointing system 200 determines the target direction $T_D$ relative to the object and the necessary PTZ commands 430 and/or alignment pose $P_A$ to align the field of sensing of the sensor 132 with the target direction $T_D$. The determined target direction $T_D$ and corresponding alignment pose P may be relative to a feature or aspect of an object detected using the model of the object or that satisfies the provided object classification.

The sensor pointing command 220, in some implementations, parameterizes the target direction $T_D$ based on scene alignment, where determining the alignment pose $P_A$ of the robot 100 that aligns the sensor 132 in the target direction $T_D$ involves processing image data 134 captured by a second sensor different from a primary sensor pointed in the target direction $T_D$ and capturing sensor data of the target location 250. For example, a camera disposed at the robot 100 captures image data 134 of the environment 30 and the sensor pointing system 200 uses the captured image data 134 to confirm or correct alignment of the primary sensor (e.g., a LIDAR sensor, a directional microphone, etc.) with the target direction $T_D$. The sensor pointing system 200 may also use a reference image of the target location 250 and compare the reference image to captured image data 134. The sensor pointing system 200 then derives a transformation from the comparison and determines a target direction $T_D$ and alignment pose P to achieve the transformation from the captured image data 134 to the reference image.

Referring back to FIG. 4, once the target direction $T_D$ is determined based on, for example, the orientation of the sensor relative to the target location 250, the sensor pointing system 200 may determine the alignment pose $P_A$ of the robot 100 to cause the sensor to point in the target direction $T_D$ toward the target location 250. The sensor pointing system 200 produces body pose commands 450 to command the robot 100 from its current pose P to the alignment pose $P_A$. For example, the sensor pointing system 200 determines the alignment pose $P_A$ and body pose commands 450 from inverse kinematics of the robot 100. The body pose commands 450 may be communicated to a robot command service 404 of the computing system 140 of the robot 100, which controls the mechanical systems of the robot 100 responsive to the body pose commands 450 to achieve the alignment pose P.

Figure 6:
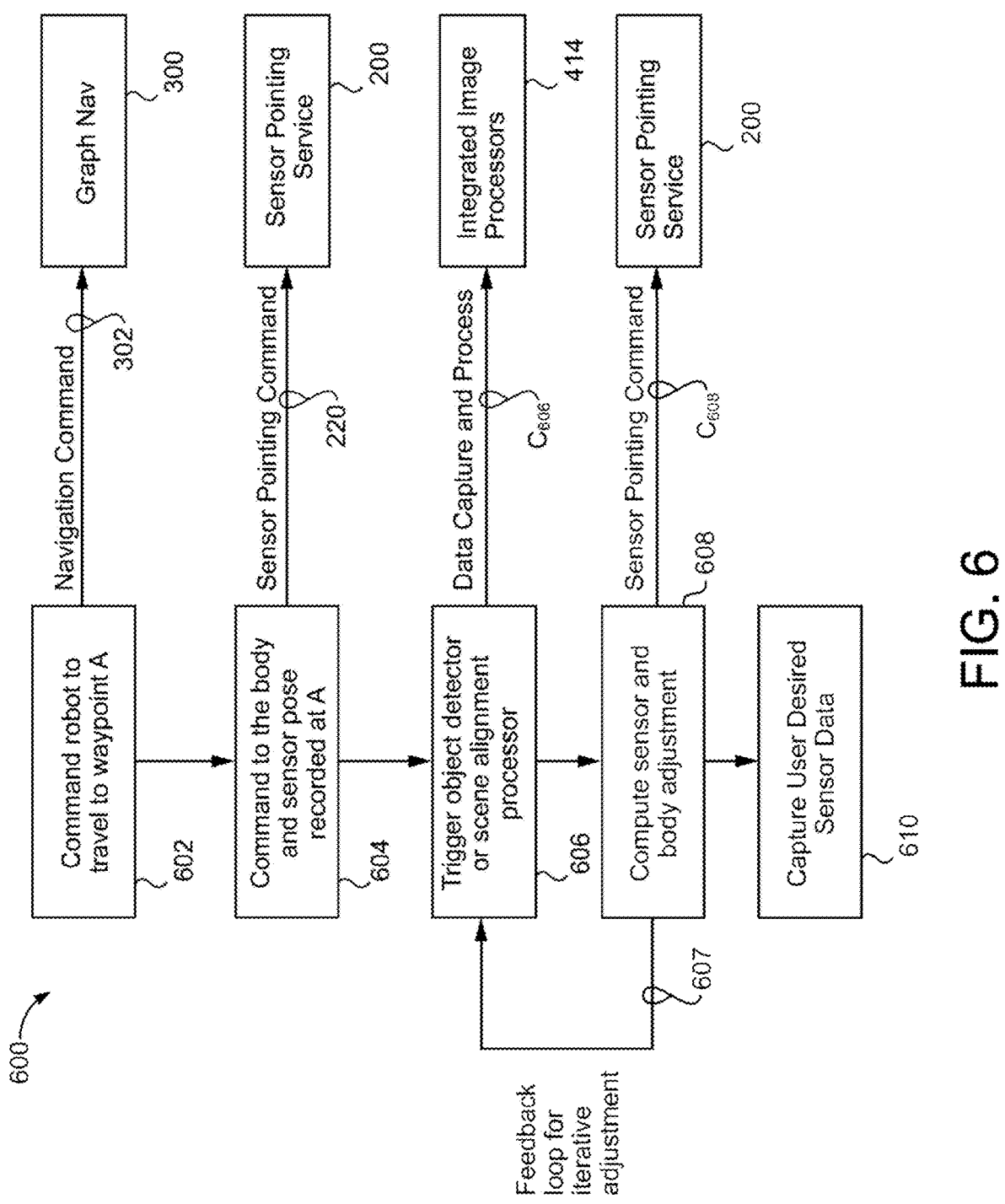
FIG. 6 is a schematic view of one embodiment of a flow chart for capturing sensor data using a sensor pointing command.

Referring now to FIG. 6, a flow chart discloses one embodiment of a process 600 for implementing a sensor pointing command 220. Here, the target direction $T_D$ is parameterized via object detection and/or scene alignment, where captured image data 134 is processed to at least guide the sensor pointing command 220 to align the sensor and the target direction $T_D$. The process 600 includes a feedback loop 607 for iterative adjustment of the sensor and body adjustment. To begin, the user 12 may specify a mission for the robot 100 and at step 602, a command commands the robot 100 to navigate to a target POI 240 (i.e., waypoint A) in the environment 30. The command may be at least in part responsive to receiving the sensor pointing command 220 or a separate navigation command 302. The navigation command 302 is communicated and implemented by the navigation system 300 of the robot 100. At step 604, the sensor pointing command 220 is communicated to the sensor pointing system 200 which determines the target direction $T_D$ and alignment pose $P_A$ of the robot 100. Before capturing the sensor data 134, the appropriate object detector or scene alignment processor 414 is triggered at step 606 and a command $C_{606}$ to capture and process image data is communicated to the image sensor and integrated image processors 414. Sensor and body pose adjustments are calculated at step 608 with an iterative feedback loop 607 providing repeated sensor and body adjustments based on the captured image data, as necessary. In other words, if needed, a command $C_{608}$ may be communicated to the sensor pointing system 200 at step 608, based on the iterative feedback loop 607, to adjust the sensor and/or body pose P. At step 610, with the robot 100 in the alignment pose $P_A$ and the sensor pointed in the target direction $T_D$ toward the target location 250, the sensor captures sensor data of the target location 250.

Figure 7:
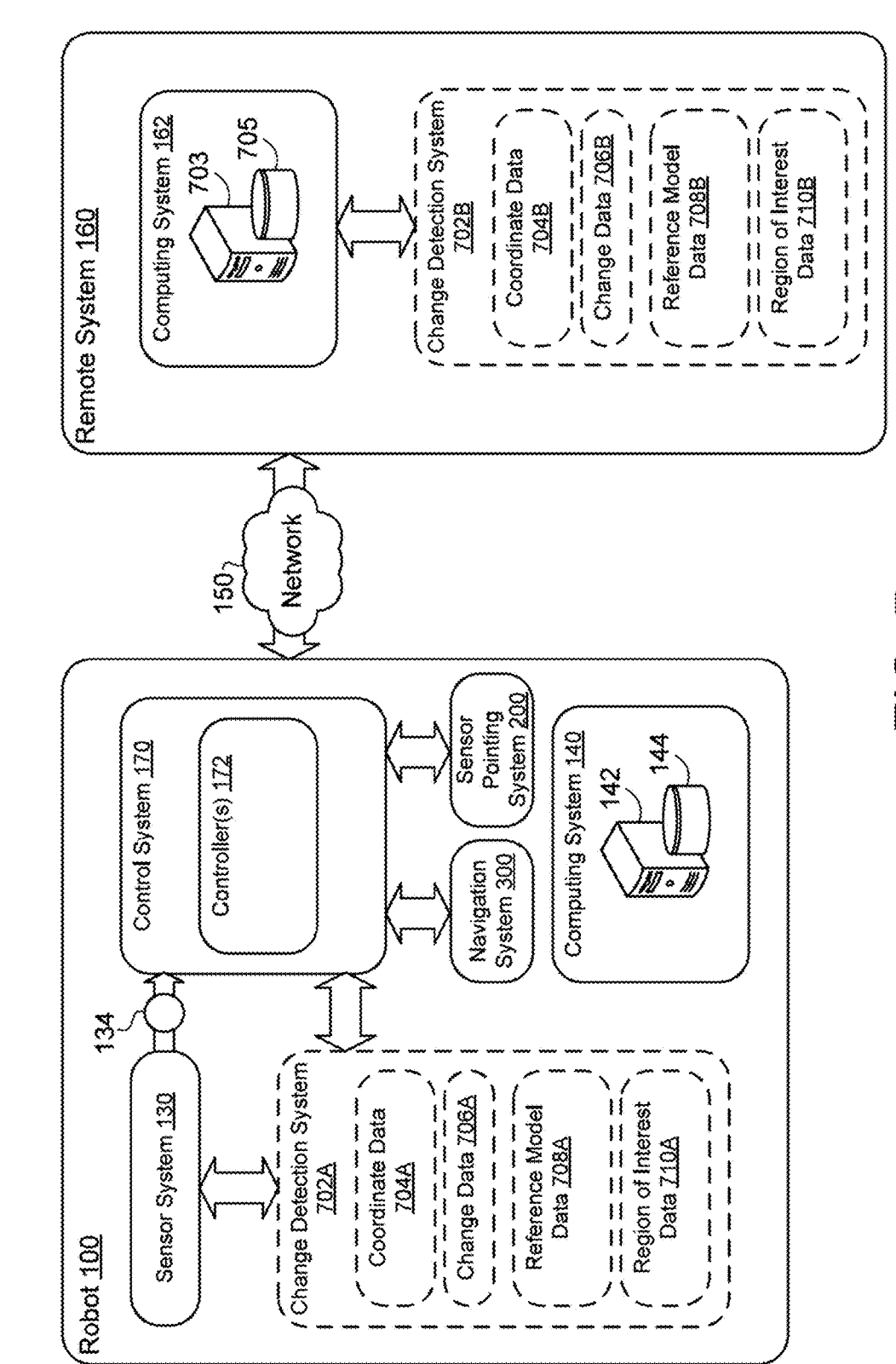
FIG. 7 is a schematic view of an example system of the robot of FIG. 1A.

Referring now to FIG. 7, the robot 100 may be similar to and/or may incorporate features of the robot 100 discussed above with respect to FIG. 1A and FIG. 1B. Further, the remote system 160 may be similar to and/or may incorporate features of the remote system 160 discussed above with respect to FIG. 1B.

As discussed above and shown in FIG. 7, the robot 100 includes a sensor system 130, a control system 170, a navigation system 300, a sensor pointing system 200, and a computing system 140. Further, the remote system 160 includes a computing system 162. The computing system 162 includes data processing hardware 703 and memory hardware 705. The data processing hardware 703 may execute instructions stored in the memory hardware 705 to perform computing tasks related to activities (e.g., implementation of a change detection system) for the robot 100. The computing system 162 may be one or more locations of data processing hardware 703 and/or memory hardware 705.

All or a portion of the robot 100 and the remote system 160 may include a change detection system. For example, as shown in FIG. 7, the robot 100 includes a change detection system 702A and the remote system 162 includes a change detection system 702B. In some cases, one or more of the robot 100 or the remote system 162 may not include a change detection system. For example, the robot 100 may include the change detection system 702A and the remote system 162 may not include a change detection system.

In the example of FIG. 7, the change detection system 702A includes coordinate data 704A, change data 706A, reference model data 708A, and region of interest data 710A. Further, the change detection system 702B includes coordinate data 704B, change data 706B, reference model data 708B, and region of interest data 710B. The change detection systems 702A and 702B may utilize the coordinate data 704A and 704B, the change data 706A and 706B, the reference model data 708A and 708B, and the region of interest data 710A and 710B to detect a change within an environment of the robot 100. In some cases, the change detection systems 702A and 702B may include and/or may utilize coordinate data 704A and 704B, change data 706A and 706B, reference model data 708A and 708B, and region of interest data 710A and 710B associated with multiple different change detections, multiple different coordinates, multiple different reference models, and/or multiple different regions of interest. In some cases, the coordinate data 704A and 704B, the change data 706A and 706B, the reference model data 708A and 708B, and the region of interest data 710A and 710B may be stored with an identifier (e.g., an identifier of a particular change detection) to indicate that each of the coordinate data 704A and 704B, the change data 706A and 706B, the reference model data 708A and 708B, and the region of interest data 710A and 710B are associated with a same change detection.

The change detection systems 702A and 702B may obtain an input from a user computing device identifying a change detection, coordinate data associated with the change detection, and/or a reference model. For example, the change detection systems 702A and 702B may obtain input from a user computing device indicating that the change detection is associated with a particular location in the environment and base sensor data for comparison with obtained sensor data. Further, the input may indicate that the change detection is to be performed at the particular location in the environment using the reference model. In some cases, the reference model may be associated with (e.g., in memory) the location (e.g., a location of the robot, a location of a mission, etc.) and/or a mission (e.g., a prior mission).

In some cases the change detection systems 702A and 702B may obtain the coordinate data via the input. In some cases, the change detection systems 702A and 702B may separately obtain coordinate data 704A and 704B (e.g., identifying a location, pose, orientation, position, etc. of the robot 100, a location, pose, orientation, position, etc. of a user computing device, etc.). For example, the change detection systems 702A and 702B may receive an input identifying a change detection and the change detection systems 702A and 702B may query a sensor of the robot 100 (e.g., in real time) to identify a location, pose, orientation, position, etc. of the robot 100 associated with the sensor data identified by the input. The change detection systems 702A and 702B may obtain the coordinate data 704A and 704B from one or more sensors (e.g., location sensors) of a robot. In some cases, the change detection systems 702A and 702B may obtain the coordinate data 704A and 704B from a user computing device.

The coordinate data 704A and 704B may include position data, orientation data, location data, pose data, etc. As discussed above, the coordinate data 704A and 704B may identify a position, orientation, location, pose, etc. of an arm, leg, distal end of a leg, a body, a sensor, etc. of the robot 100 and/or of a user computing device.

The change detection systems 702A and 702B can obtain the change data 706A and 706B. The change data 706A and 706B may identify a change detection. In some cases, the change detection systems 702A and 702B can obtain the change data 706A and 706B via the input (e.g., via the user computing device). In some cases, the change detection systems 702A and 702B can obtain the change data 706A and 706B from another robot, a separate system, etc. For example, a first robot may indicate to a second robot that a change detection is to be performed at a particular location within the environment of the second robot.

The change detection systems 702A and 702B can obtain the reference model data 708A and 708B. The change detection systems 702A and 702B can obtain the reference model data 708A and 708B via the input or separately from the input. For example, the change detection systems 702A and 702B can obtain base reference model data for multiple change detections. In some cases, the base reference model data may be generic across multiple change detections such that individual training is not required across different change detections. The reference model data 708A and 708B may identify a reference model. In some cases, the change detection systems 702A and 702B may identify the reference model data 708A and 708B based on a location (e.g., of the robot 100, of an inspection mission, etc.) and/or a mission identifier (e.g., an inspection mission identifier. For example, the change detection systems 702A and 702B may identify the reference model data 708A and 708B based on determining one or more locations associated with (e.g., indicated by) an inspection mission correspond to (e.g., match) one or more locations associated with the reference model (e.g., as indicated by the reference model data 708A and 708B).

In some cases, the reference model can include and/or implement one or more machine learning models (e.g., neural networks) to detect a change. For example, the change detection systems 702A and 702B can include and/or implement a deep neural network(s). The machine learning models may be trained (e.g., using supervised learning) to detect a change. For example, the change detection systems 702A and 702B may train the machine learning models to detect a change.

In some cases, the reference model can include and/or implement base sensor data to compare with obtained sensor data to detect a change. For example, the base sensor data may reflect an environment without a change (e.g., a base environment). In some cases, the base sensor data may include a single frame or a plurality of frames.

In some cases, the reference model can include a statistical model (e.g., a set of sensor data associated with the environment). For example, the statistical model may include a Gaussian mixture model. In some cases, the reference model may include any combination of base sensor data, a machine learning model, a statistical model, etc.

The change detection systems 702A and 702B can obtain the region of interest data 710A and 710B. The change detection systems 702A and 702B can obtain the region of interest data 710A and 710B via the input or separately from the input. The region of interest data 710A and 710B may identify a portion or subset of sensor data obtained via one or more sensors (e.g., one or more sensors of the robot 100, one or more sensors of a user computing device, etc.). In some cases, one or more systems of the robot 100 and/or the remote system 160 may cause display of the sensor data at a user computing device. The one or more systems of the robot 100 and/or the remote system 160 may obtain the region of interest data 710A and 710B from the user computing device. For example, a user may draw, outline, add, etc. a region of interest relative to the sensor data displayed at the user computing device (e.g., on a display of the user computing device) to generate the region of interest data 710A and 710B.

To perform the change detection identified by the change data 706A and 706B, the change detection systems 702A and 702B may instruct movement of the robot 100 according to the coordinate data 704A and 704B. For example, the change detection systems 702A and 702B may instruct the robot 100 to navigate to a particular location identified by the coordinate data 704A and 704B and to orient a body of the robot 100 and a sensor of the robot 100 according to the coordinate data 704A and 704B. In some cases, the change detection systems 702A and 702B may not instruct movement of the robot 100 according to the coordinate data 704A and 704B.

Based on instructing movement of the robot 100 according to the coordinate data 704A and 704B, the change detection systems 702A and 702B may determine whether coordinate data associated with the robot 100 matches the coordinate data 704A and 704B. In some cases, the change detection systems 702A and 702B may periodically or aperiodically determine whether the coordinate data associated with the robot 100 matches the coordinate data 704A and 704B without instructing movement of the robot 100 according to the coordinate data 704A and 704B.

To determine whether the coordinate data associated with the robot 100 matches the coordinate data 704A and 704B, the change detection systems 702A and 702B may obtain coordinate data associated with the robot 100. In some cases, the change detection systems 702A and 702B may obtain the coordinate data associated with the robot 100 based on sensor data. For example, the change detection systems 702A and 702B may obtain sensor data from one or more sensors (e.g., one or more sensors of a robot). Based on the sensor data, the change detection systems 702A and 702B may identify coordinate data (e.g., indicative of a location, pose, orientation, position, etc.) of the robot 100. Further, the change detection systems 702A and 702B may identify whether the coordinate data of the robot 100 matches the coordinate data 704A and 704B.

Based on determining that the coordinate data of the robot 100 matches the coordinate data 704A and 704B and determining that the coordinate data 704A and 704B is associated with a change detection identified by the change data 706A and 706B, the change detection systems 702A and 702B can obtain sensor data from a sensor of the robot 100. In some cases, the change detection systems 702A and 702B can obtain sensor data from a sensor one or more sensors of one or more robots. For example, the change detection systems 702A and 702B can obtain a first portion of the sensor data from a first sensor of a first robot, a second portion of the sensor data from a second sensor of the first robot, a third portion of the sensor data from a first sensor of a second robot, etc. The change detection systems 702A and 702B may identify the one or more sensors based on the coordinate data 704A and 704B, the change data 706A and 706B, the reference model data 708A and 708B, and/or the region of interest data 710A and 710B.

In some embodiments, the change detection systems 702A and 702B can obtain different portions of the sensor data from sensors of the robot having different sensor types. For example, the sensors of the robot may include a LIDAR sensor, a camera, a LADAR sensor, etc. In some cases, the change detection systems 702A and 702B can obtain sensor data from one or more sensors that are separate from the one or more robots (e.g., sensors of an external monitoring system).

The sensor data may include point cloud data. For example, the sensor data may identify a discrete plurality of data points in space. All or a portion of the discrete plurality of data points may represent an object and/or shape. Further, all or a portion of the discrete plurality of data points may have a set of coordinates (e.g., Cartesian coordinates) identifying a respective position of the data point within the space.

The change detection systems 702A and 702B may identify region of interest data 710A and 710B associated with the sensor data. As discussed above, the region of interest data 710A and 710B may identify a region of interest within the sensor data. For example, the region of interest may correspond to a portion of the sensor data (e.g., a portion of a frame, a frame, a subset of frames, etc.). Therefore, the change detection systems 702A and 702B may identify a portion of sensor data associated with the region of interest.

Based on identifying the region of interest, the change detection systems 702A and 702B may perform the change detection identified by the change data 706A and 706B. To perform the change detection, the change detection systems 702A and 702B may process (e.g., transform) the portion of sensor data. For example, the change detection systems

702A and 702B may process the portion of sensor data to align the portion of sensor data with base sensor data (e.g., from the reference model). The change detection systems 702A and 702B may perform dense alignment, interpolated semi-dense alignment, template matching alignment, etc. of the portion of sensor data with the base sensor data. For example, the change detection systems 702A and 702B may utilize dense optic flow methods to perform a dense pixel-by-pixel alignment. The change detection systems 702A and 702B may perform the pixel-by-pixel alignment based on a region of interest in the base sensor data to identify a corresponding region of interest in the obtained sensor data (e.g., a query image). The change detection systems 702A and 702B can utilize sensor data not associated with the region of interest (e.g., base sensor data not associated with the region of interest) to identify the region of interest in the obtained sensor data. In some cases, to process the portion of sensor data, the change detection systems 702A and 702B may utilize a machine learning model (e.g., a convolutional neural network). For example, the machine learning model may perform optic flow to process the portion of sensor data.

The change detection systems 702A and 702B may further process the portion of sensor data by performing one or more image post-processing operations. For example, the change detection systems 702A and 702B may adjust a brightness, a color balance, a white balance, a contrast, an exposure, etc. Therefore, the change detection systems 702A and 702B may obtain a processed portion of sensor data. In some cases, the change detection systems 702A and 702B may not process the portion of sensor data.

In some cases, to perform the change detection, the change detection systems 702A and 702B may obtain base sensor data from the reference model. The change detection systems 702A and 702B may compare the processed portion of sensor data (or the unprocessed portion of sensor data) to the base sensor data. In some cases, the change detection systems 702A and 702B may perform image differencing to identify a difference score (e.g., a change metric) for all or a portion of the pixels of the processed portion of sensor data as compared to a corresponding pixel of the base sensor data. For example, the difference score may identify a difference between a pixel value of a pixel of the processed portion of sensor data and a pixel value of a corresponding pixel of the base sensor data. In one example, the change detection systems 702A and 702B may perform image differencing via a pixel max-pooling. In some cases, the change detection systems 702A and 702B may detect occlusion edges and may adjust the image differencing based on the detection of occluding edges. In some cases, the change detection systems 702A and 702B may determine the difference score without regard to illumination (e.g., in an illumination insensitive manner) over patches of pixels (e.g., instead of single pixels). For example, the change detection systems 702A and 702B may determine a difference between a values of a patch of pixels of the processed portion of the sensor data and a value of a corresponding patch of pixels of the base sensor data.

In some cases, the change detection systems 702A and 702B may determine a difference score for multiple images of the reference model. For example, the reference model may identify a plurality of images and the change detection systems 702A and 702B may determine a difference score for all or a portion of the plurality of images.

In some cases, to perform the change detection, the change detection systems 702A and 702B may utilize a neural network trained to detect anomalies to identify anomalies within the processed portion of sensor data. In some cases, the change detection systems 702A and 702B may utilize the neural network in parallel with the change detection systems 702A and 702B comparing the processed portion of sensor data to the base sensor data. The neural network may generate a pixel-wise mask that identifies particular pixels as corresponding to anomalies and/or particular pixels as not corresponding to anomalies.

In some cases, to perform the change detection, the change detection systems 702A and 702B may compare the pixel-wise mask to the difference score. In some cases, the pixel-wise mask and/or the difference score may be associated with a weight and the change detection systems 702A and 702B may compare the pixel-wise mask to the difference score according to one or more associated weights. In some cases, the change detection systems 702A and 702B may compare the pixel-wise mask to the difference score using a voting mechanism.

In some cases, to perform the change detection, the change detection systems 702A and 702B may compare the difference score, the results of the comparison of the pixel-wise mask to the difference score, and/or the pixel-wise mask to a threshold (e.g., a threshold value, a threshold range, a threshold level, etc.). For example, the threshold may be a sensitivity threshold.

In some cases, to perform the change detection, the change detection systems 702A and 702B may compare the difference score to a statistical model (e.g., of the reference model). For example, the change detection systems 702A and 702B may compare all or a portion of the difference scores to an output of the statistical model that identifies one or more predictions and/or assumptions for pixel values of corresponding pixels.

The change detection systems 702A and 702B may detect one or more changes. For example, the change detection systems 702A and 702B may identify one or more pixels as corresponding to (or predicted to correspond to) one or more changes based on the performed image differencing, the output of the neural network, the output of the statistical model, the comparison of all or a portion of the difference scores to the threshold, and/or the comparison of all or a portion of the difference scores to the output of the statistical model.

Based on the detected one or more changes, the change detection systems 702A and 702B can identify whether the one or more changes correspond to anomalies (e.g., using a machine learning model). For example, the change detection systems 702A and 702B can determine (e.g., predict) whether the one or more changes were anomalous changes or desired changes. In some cases, the change detection systems 702A and 702B may be trained to identify particular changes as anomalous changes or desired changes.

In some cases, the change detection systems 702A and 702B may identify one or more anomalies based on analyzing the one or more changes using a sensitivity threshold. For example, the sensitivity threshold may be a confidence threshold for determining whether a change corresponds to an anomaly. In some cases, the change detection systems 702A and 702B may obtain the sensitivity threshold from a user computing device. For example, the change detection systems 702A and 702B may cause display of a user interface via the user computing device that includes an input section (e.g., a slider) to provide the sensitivity threshold).

Based on identifying one or more changes as corresponding to anomalies, the change detection systems 702A and 702B can generate an output (e.g., a segmentation mask). The output may include labels for all or a portion of the pixels identified as corresponding to an anomaly. The change detection systems 702A and 702B may cause display of the output, the reference model (e.g., the base sensor data), the unprocessed sensor data, and/or the processed sensor data via a user interface of a user computing device. In some cases, the change detection systems 702A and 702B may generate and/or cause display of an alert via the user computing device based on identifying one or more changes as corresponding to anomalies. Further, the change detection systems 702A and 702B may generate log data indicating the one or more changes as corresponding to anomalies.

The change detection systems 702A and 702B may obtain feedback from the user computing device. For example, the feedback may include input identifying whether an identified anomaly corresponds to an anomaly. In another example, the feedback may include input identifying one or more anomalies within the sensor data (e.g., anomalies that may or may not have been identified by the change detection systems 702A and 702B). The input may include one or more bounding box annotations associated with the sensor data and identifying the anomalies. In another example, the feedback may include an updated reference model. The updated reference model may include updated base sensor data. Therefore, the machine learning model (and the change detection systems 702A and 702B) may be retrained, updated, and improved (e.g., continuously) based on feedback obtained from user computing devices.

In some cases, the change detection systems 702A and 702B may retrain a machine learning model for identifying the anomalies based on the feedback. In some cases, user computing device may trigger retraining of the machine learning model and the change detection systems 702A and 702B may obtain the retrained machine learning model from the user computing device.

Figure 8A:
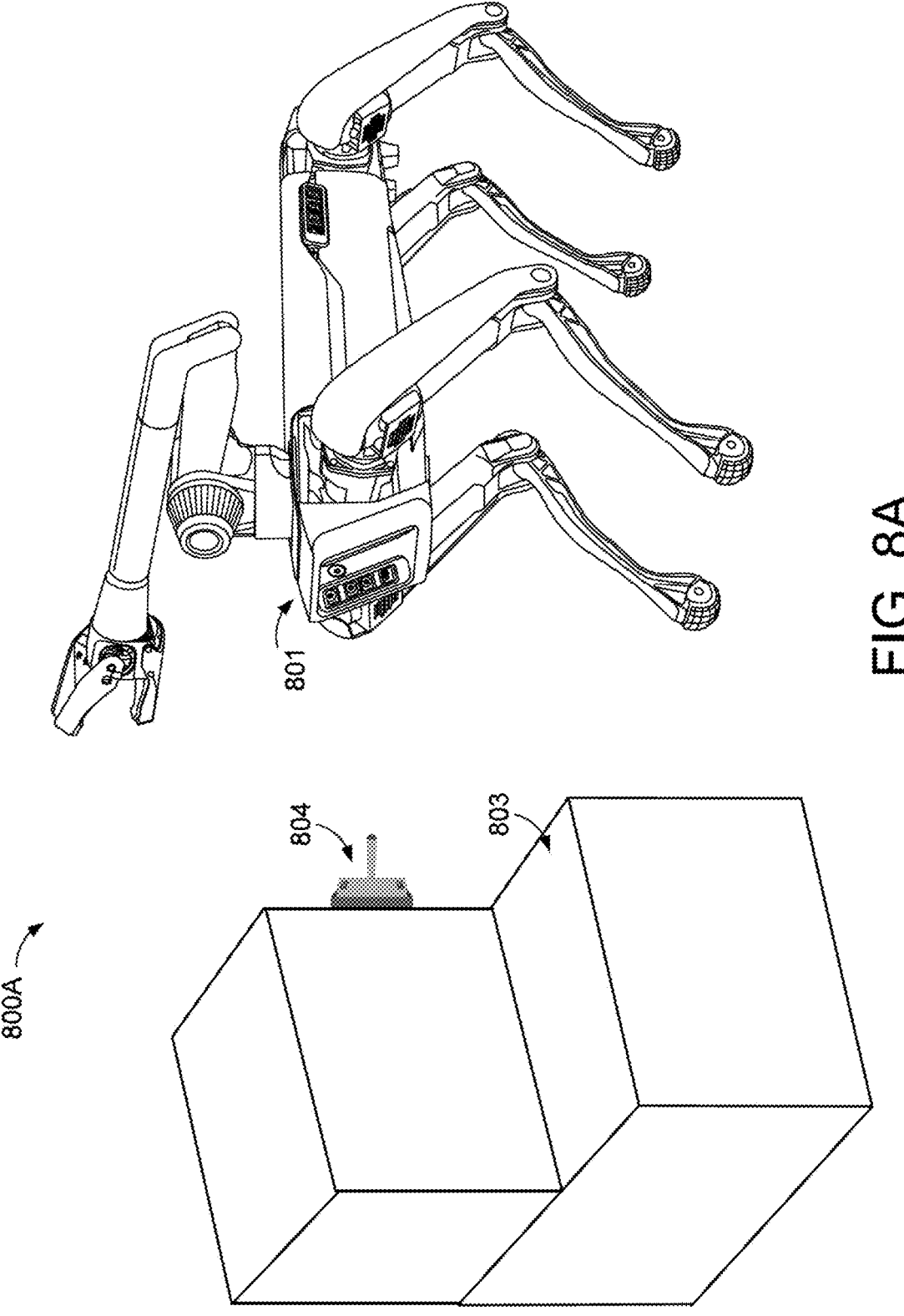
FIG. 8A is a schematic view of a robot in an environment with an object of interest.
Figure 8B:
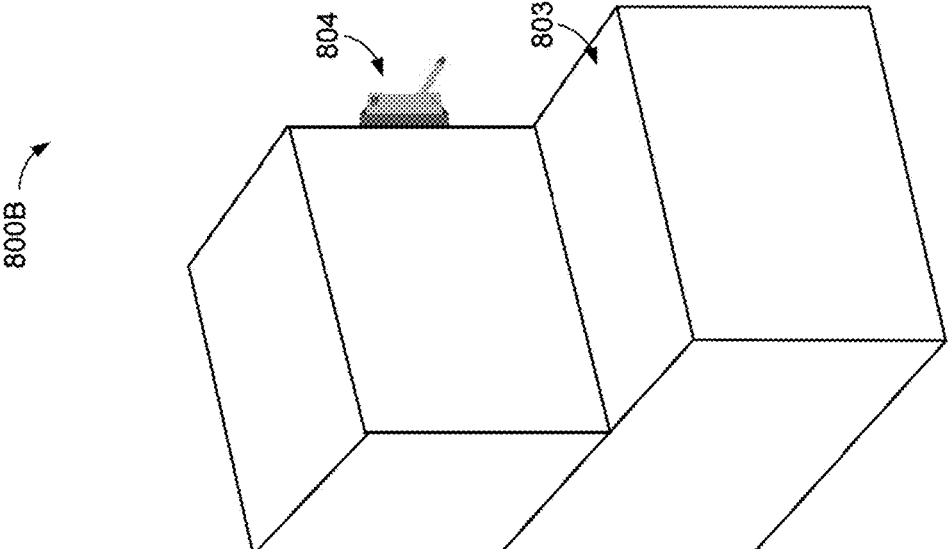
FIG. 8B is a schematic view of a robot in an environment with an object of interest.
Figure 8C:
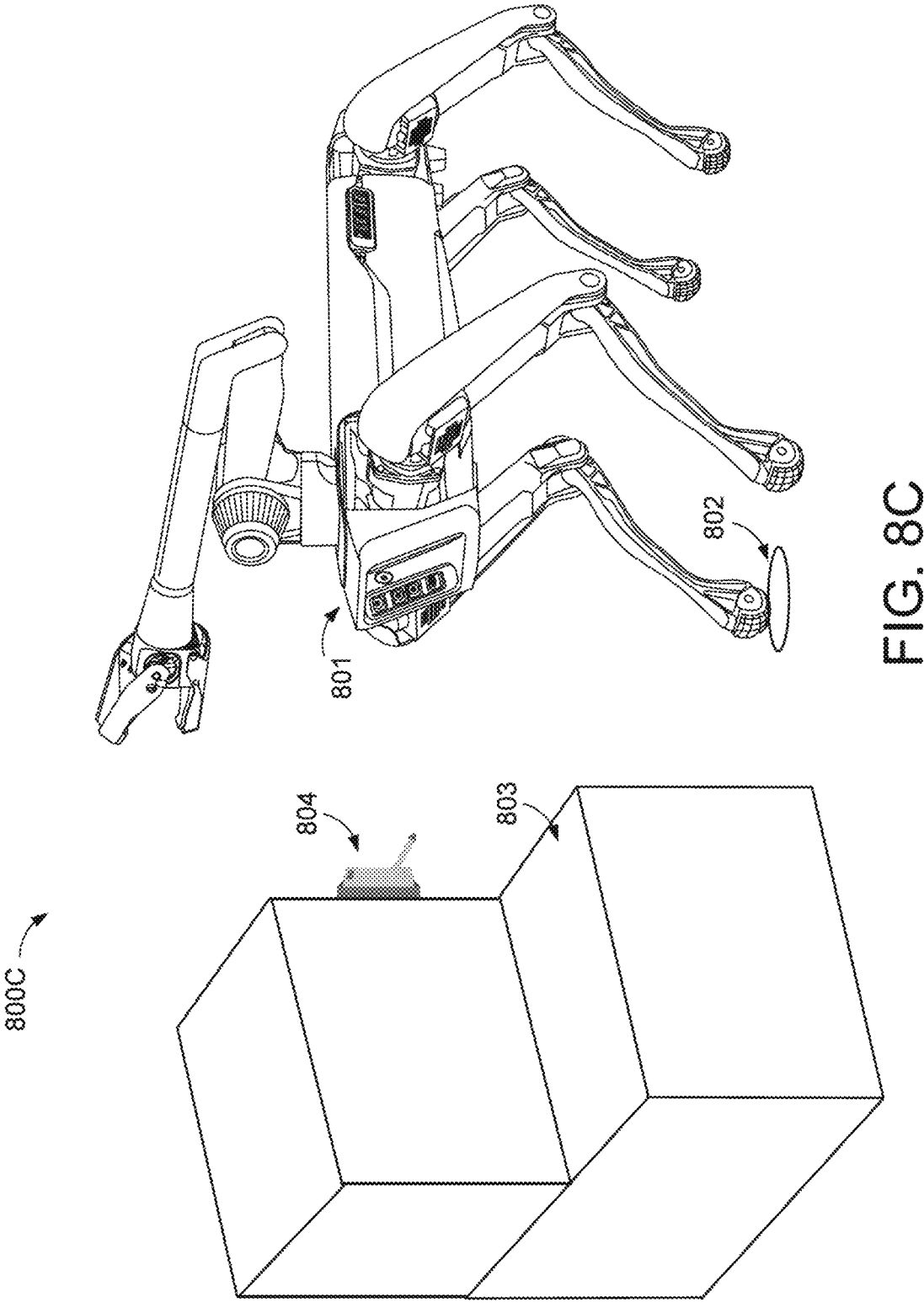
FIG. 8C is a schematic view of a robot in an environment with an object of interest.

FIGS. 8A-8C show the progression of a robot 801 as the change detection is performed. The operations to determine the change detection and perform the change detection may include multiple sub-operations. For example, each of the FIGS. 8A-8C may correspond to a particular sub-operation of the operations. It will be understood that in some embodiments, more, fewer, or different sub-operations may be performed as part of determining the change detection and performing the change detection. For example, in some cases, a first sub-operation as identified in FIG. 8A may not be performed. In another example, the coordinate data associated with the change detection may include more, less, or different coordinate data. For example, the coordinate data may include coordinate data for all or a portion of the distal ends of the legs of the robot 801.

FIG. 8A shows a schematic view 800A of a robot 801 relative to an object 803. The robot 801 may be oriented relative to the object 803 such that a front portion of the robot 801 faces the object 803. The robot 801 may be a legged robot. In the example of FIG. 8A, the robot 801 is a legged robot that includes four legs: a first leg (e.g., a right rear leg), a second leg (e.g., a left rear leg), a third leg (e.g., a right front leg), and a fourth leg (e.g., a left front leg). The object 803 may be a box, a platform, all or a portion of a vehicle, a desk, a table, a ledge, etc. In some cases, the robot 801 may be navigating the environment (e.g., according to an inspection mission). For example, the schematic view 800A may correspond to a first state of the robot 801 associated with performance of the inspection mission.

The object 803 may be associated with a switch 804. For example, the switch 804 may be affixed to the object 803. The switch 804 may have a plurality of positions. For example, a first position may correspond to an on state and a second position may correspond to an off state.

The robot 801 may be associated with coordinate data of the robot 801 (e.g., a pose, orientation, location, position, etc. of the robot 801). For example, the coordinate data may identify a distance from the robot 801 to the object 803, a position of the robot 801 within the environment of the robot 801, a position of one or more distal ends of one or more legs of the robot 801, a position of one or more sensors of the robot 801, a position of the body of the robot 801, a position of the arm of the robot 801, etc.

The robot 801 may obtain sensor data via a plurality of sensors of the robot 801 and may provide the sensor data associated with all or a portion of the plurality of sensors to a user computing device. The sensor data may be indicative of the environment and may identify the object 803 and/or the switch 804.

The robot 801 may obtain input via a user computing device. The input may identify one or more sensors of the plurality of sensors, a particular portion of sensor data (e.g., one or more frames and a region of interest within the one or more frames), and an indication to perform a change detection. In the example of FIG. 8A, the input may identify the switch 804 (e.g., the input may identify a region of interest associated with (containing) the switch 804) and the change detection may be to detect changes associated with the switch 804.

In some cases, the robot 801 may generate a reference model based on the particular portion of sensor data. For example, the reference model may include the particular portion of sensor data. In the example of FIG. 8A, the reference model indicates a first position of the switch 804 (e.g., the switch 804 is in the on position).

Based on obtaining the input, the robot 801 may determine coordinate data of the robot 801 associated with the input. For example, the robot 801 may determine coordinate data of the robot 801 when the particular portion of sensor data identified by the input was captured (e.g., coordinates of the robot 801 for capture of the particular portion of sensor data). Therefore, the robot 801 may associate the change detection, the region of interest, the reference model, and/or the coordinate data for subsequent missions.

FIG. 8B shows a schematic view 800B of the robot 801 relative to the object 803. The schematic view 800B may identify a second state of the robot 801 (e.g., corresponding to a subsequent mission after an initial inspection mission). In some cases, the schematic view 800A may be a schematic view of a first robot and the schematic view 800B may be a schematic view of a second robot. For example, the inspection mission and subsequent missions may be performed by different robots.

The robot 801 may obtain instructions to perform a change detection (e.g., to detect whether a change has occurred). In the example of FIG. 8B, the change detection includes detection of a change associated with the switch 804. As shown in FIG. 8B, the position of the switch 804 has changed relative to the reference model discussed above (e.g., the position of the switch 804 has changed from the on position to the off position).

Based on obtaining the instructions, the robot 801 may identify coordinate data associated with the change detection and cause the robot 801 to move according to the coordinate data. To cause the robot 801 to move according to the coordinate data, the robot 801 may cause one or more components (e.g., an arm, a leg, a sensor, a body, etc.) to move according to the coordinate data and change a location, position, pose, orientation, etc. In the example of FIG.

8B, the coordinate data includes a position 802 for a distal end of a leg of the robot 801. It will be understood that the coordinate data may include a position, orientation, location, pose, etc. for more, fewer, or different components of the robot 801 (e.g., a body, sensor, arm, different leg, etc. of the robot 801).

In some cases, the robot 801 may not obtain instructions to perform a change detection. Instead, the robot 801 may determine that coordinate data of the robot 801 matches coordinate data associated with the change detection. Based on determining that the coordinate data of the robot 801 matches the coordinate data associated with the change detection, the robot 801 may perform the change detection.

FIG. 8C shows a schematic view 800C of the robot 801 relative to the object 803. The schematic view 800C may identify a third state of the robot 801 after moving according to the coordinate data. As shown in FIG. 8C, the robot 801 has moved such that the distal end of a leg of the robot 801 corresponds to the position 802 identified by the coordinate data.

In some cases, moving according to the coordinate data may include aligning one or more sensors of the robot 801. For example, the robot 801 may align one or more sensors to match a position, orientation, pose, location, etc. associated with the one or more sensors identified by the coordinate data. In some cases, moving according to the coordinate data may include moving such that a region of interest is within a frame of the one or more sensors. In such cases, moving according to the coordinate data may not include moving such that the coordinate data of the robot matches and/or is within a threshold range of the coordinate data.

The robot 801 may determine that movement has occurred such that the coordinate data of the robot 801 matches and/or is within a threshold range of the coordinate data associated with the change detection and/or that the region of interest is within a frame of the one or more sensors. Based on determining that the movement has occurred, the robot 801 can perform the change detection.

To perform the change detection, the robot 801 may obtain sensor data and analyze the sensor data based on the change detection, the region of interest, and the reference model. Based on analyzing the sensor data, the robot 801 may detect one or more changes and determine whether the one or more changes correspond to one or more anomalies. The robot 801 may route the sensor data, the detected changes, the detected anomalies, and/or an associated alert to a user computing device for review. In the example of FIG. 8C, the robot 801 determines that a position of the switch 804 has changed relative to the reference model discussed above (e.g., the position of the switch 804 has changed from the on position to the off position), determines that the change in the position of the switch 804 is an anomaly, and routes an alert to the user computing device.

Figure 9A:
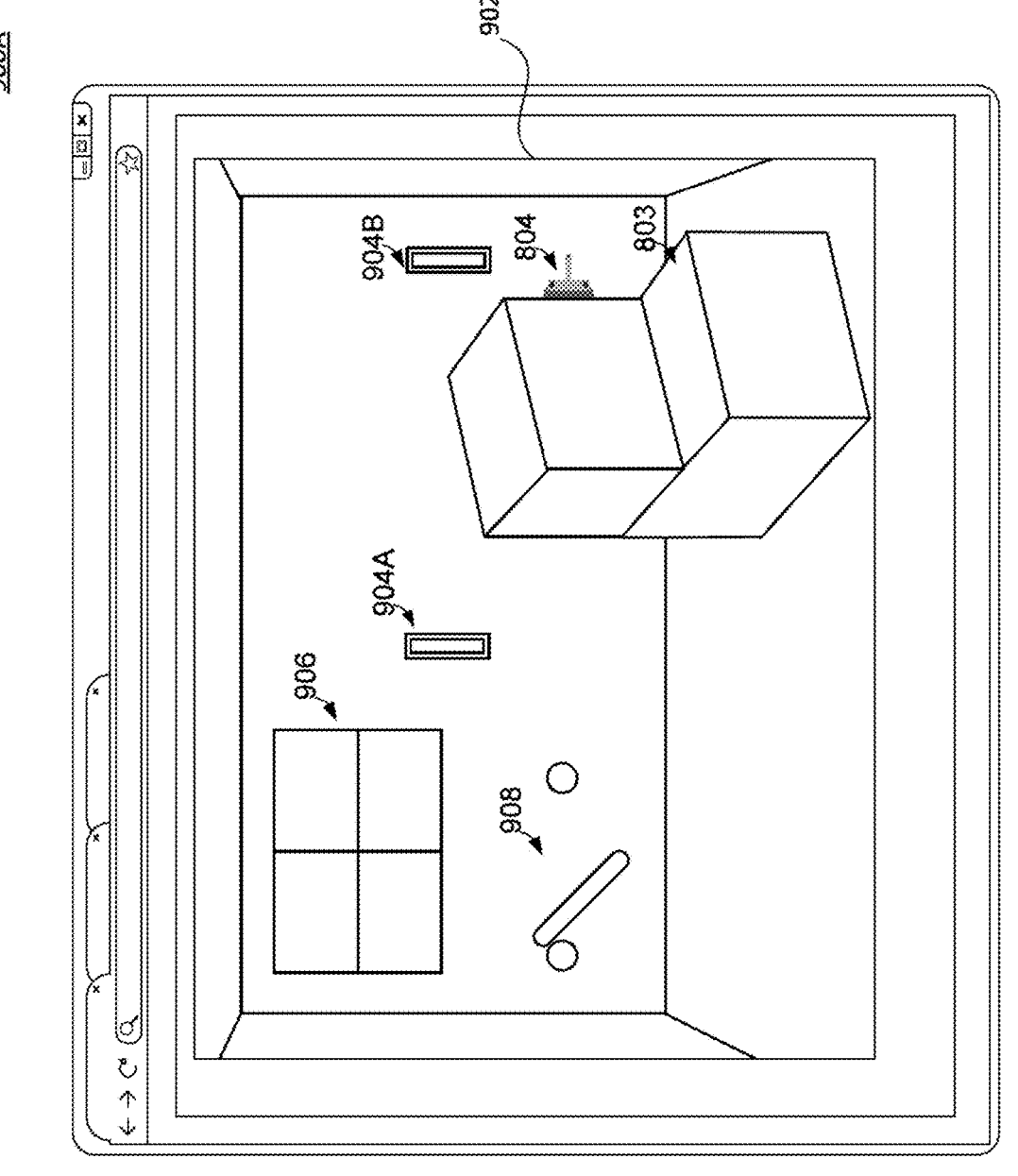
FIG. 9A is a schematic view of an example user interface indicating image data associated with a location.

FIG. 9A depicts an example user interface 900A for display via a user computing device for identifying a representation 902 of sensor data associated with an environment. For example, the sensor data may be obtained from a robot, a user computing device, etc. Further, the sensor data may be obtained via one or more sensors of a robot, one or more sensors of a user computing device, etc. The user interface 900A may enable a user (e.g., a site operator) to define a region of interest and request performance of a change detection.

In some cases, a robot may perform an inspection mission to inspect an environment. The robot may stream sensor data associated with the environment to a user computing device in real time for display of the representation of the sensor data.

The environment may include, and the sensor data may be indicative of one or more objects, obstacles, structures, or entities within the environment. In the example of FIG. 9A, the environment includes and the representation 902 of the sensor data identifies an object 803, a switch 804, a screen 904A, a screen 904B, a window 906, and a lever 908. It will be understood that the environment may include, and the sensor data may be indicative of more, fewer, or different objects, entities, structures, or obstacles.

In some cases, a system may determine one or more predicted regions of interest. The system may provide the sensor data to a machine learning model and the machine learning model may predict a particular region of interest within the sensor data. For example, the system may determine a first predicted region of interest corresponding to the lever 908 and a second predicted region of interest corresponding to the switch 804. The system may provide one or more predicted regions of interest for display via the user interface 900A. For example, the user interface 900A may identify the one or more predicted regions of interest (e.g., via one or more bounding boxes) and may request confirmation or rejection of the predicted regions of interest.

Figure 9B:
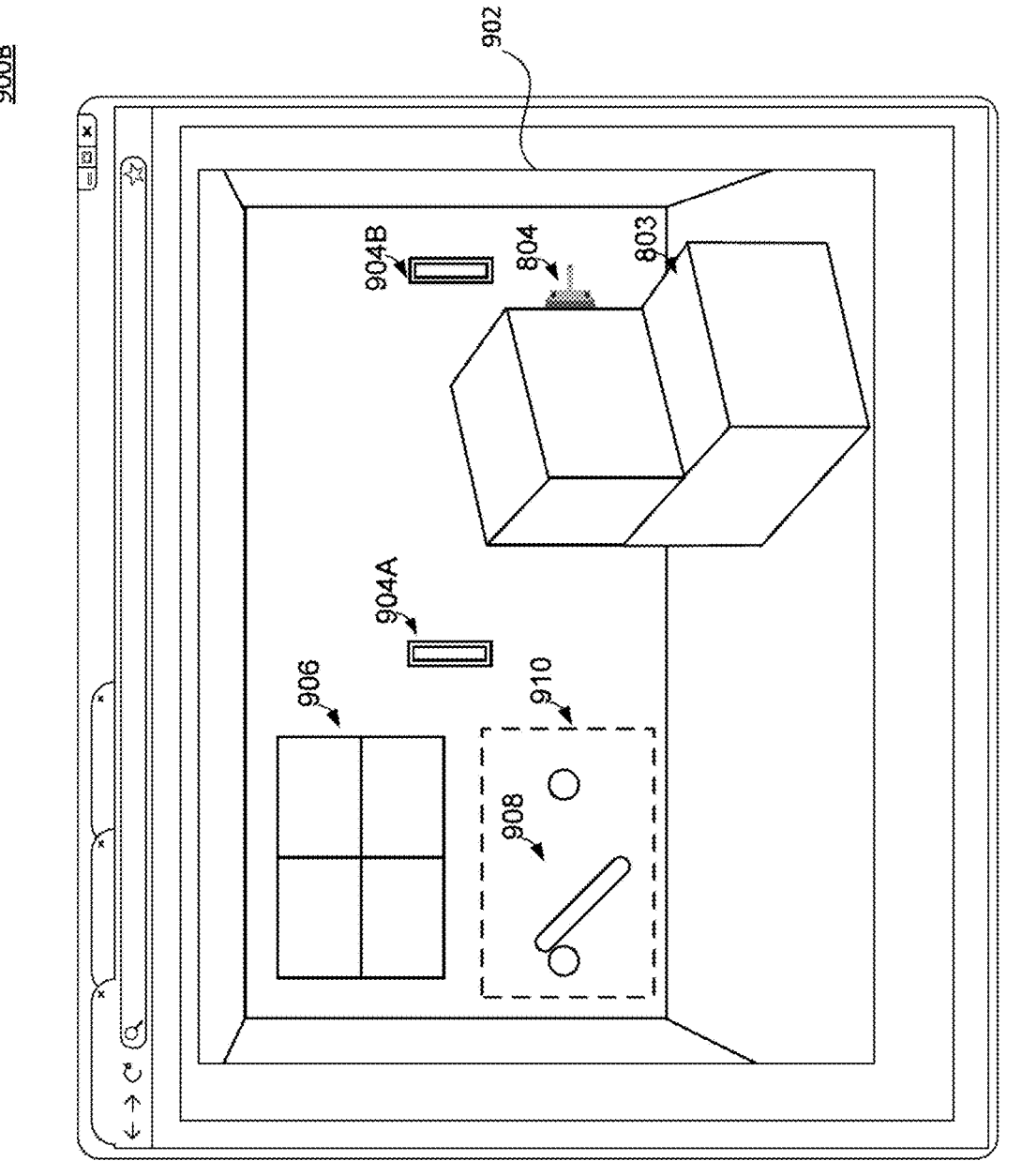
FIG. 9B is a schematic view of an example user interface indicating a region of interest within image data.

FIG. 9B depicts an example user interface 900B for display via a user computing device identifying a region of interest 910. As discussed above, the user interface identifies a representation 902 of sensor data. Based on the representation 902 of the sensor data, a user may define the region of interest 910 and the region of interest 910 may be routed to a system associated with a robot.

The region of interest 910 may be defined based on an input. For example, the input may identify one or more bounding boxes, one or more coordinates, one or more selections, etc. In the example of FIG. 9B, the region of interest 910 is depicted as a bounding box associated with the lever 908. Therefore, the region of interest 910 may indicate that the robot is to perform a change detection for the lever 908.

The user computing device (or a separate system) may route the region of interest 910 to the system associated with the robot. The system may perform the change detection based on the region of interest 910. It will be understood that the region of interest 910 may include more, fewer, or different regions of interest.

In some cases, the system associated with the robot may update the user interface 900B based on detected changes. For example, the system may determine that a change has occurred associated with the region of interest 910, may determine that the change represents an anomaly, and may cause display of an alert via the user interface 900B (e.g., the alert identifying the region of interest 910 associated with the alert).

Figure 10:
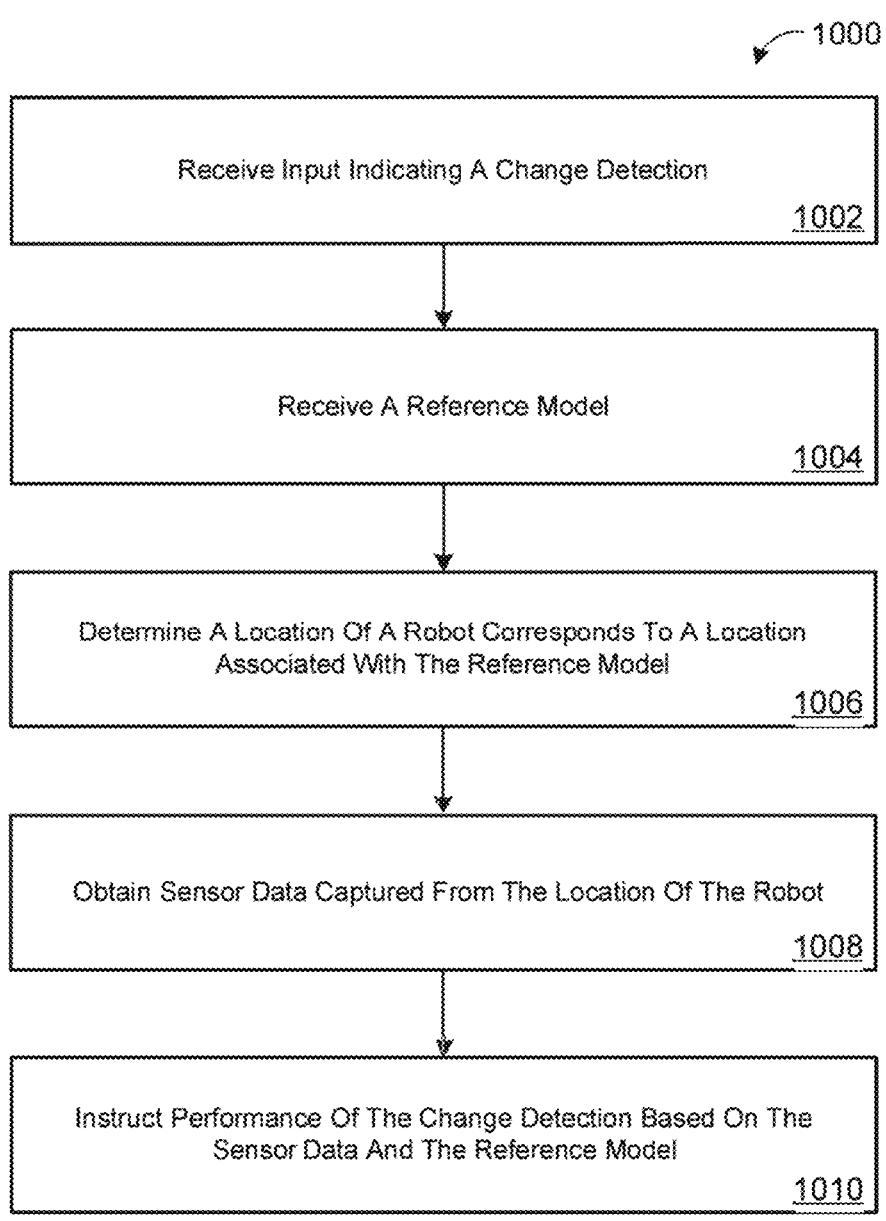
FIG. 10 is a flowchart of an example arrangement of operations for performing a change detection.

FIG. 10 shows a method 1000 executed by a computing system that identifies a change detection and instructs a robot (e.g., a mobile robot, a legged mobile robot, a two-legged mobile robot, or a four-legged mobile robot) to perform the change detection, according to some examples of the disclosed technologies. The computing system may be similar, for example, to and/or may include the change detection system 702A, the sensor system 130, the control system 170, the computing system 140, the computing system 162, and/or the change detection system 702B as discussed above, and may include memory and/or data processing hardware. For example, the computing system may be located on and/or externally to the robot.

At block 1002, the computing system receives input indicating a change detection (e.g., the change detection may include an anomaly detection). In some cases, the computing system may receive the input from a user computing device. For example, the computing system may receive the input via a user computing device from a user (e.g., a site operator).

Prior to receiving the input, the robot may move to a particular orientation, pose, location, position, etc. and may associate the change detection with the particular orientation, pose, location, position, etc. (e.g., coordinate data). For example, the robot may navigate to a location associated with a change detection and/or the computing system may instruct navigation of the robot to the location associated with the change detection. The coordinate data associated with the change detection may include coordinate data of one or more sensors of the robot, coordinate data of one or more sensors of a user computing device, coordinate data of a body of the robot, coordinate data of an arm of the robot, coordinate data of a leg of the robot and/or a distal end of the leg, etc. In some cases, the coordinate data may include multiple sub-orientations, sub-poses, sub-locations, sub-positions, etc. (e.g., a first sub-location of a body of the robot and a second sub-location of one or more sensors of the robot or a user computing device).

The computing system may instruct navigation of the robot to move to a particular orientation, pose, location, position, etc. associated with the change detection as part of an initial mission (e.g., an initial inspection mission). Further, the computing system may instruct one or more sensors to move to a particular orientation, pose, location, position, etc. and capture base sensor data. In some cases, the computing system may identify a particular sensor (e.g., based on the input), may move the particular sensor to a particular orientation, pose, location, position, etc. (e.g., based on the input), and may instruct capturing of the base sensor data at the particular orientation, pose, location, position, etc.

In some cases, one or more additional sensors external to the robot (e.g., sensors of the user computing device (or a separate computing system)) may capture the base sensor data and may provide the base sensor data to the computing system. Further, the user computing device or the separate computing system may provide an orientation, pose, location, position, etc. associated with the user computing device or the separate computing system and the capture of the base sensor data.

As discussed below, the input may include the base sensor data. In some cases, the input may include the coordinate data (e.g., indicative of a particular location).

The input may further indicate a region of interest within the base sensor data. For example, the region of interest may identify a portion of the base sensor data for performance of the change detection. The computing system may identify a portion of the base sensor data based on the region of interest.

At block 1004, the computing system receives a reference model. The reference model may be associated with the change detection and the coordinate data (e.g., a location). The computing system may identify the coordinate data associated with the reference model. For example, the computing system may parse the reference model to identify a location associated with the reference model (e.g., a location corresponding to a location where base sensor data of the reference model was collected). In some cases, the computing system may receive the reference model as part of the input.

The reference model may identify and/or include one or more of sensor data (e.g., an image, a collection of images, etc.), a machine learning model (e.g., a neural network), a statistical model (e.g., encapsulating a set of reference images), etc. For example, the reference model may include and/or identify base sensor data obtained during the initial mission. The computing system may obtain first sensor data for comparison with the base sensor data (e.g., second sensor data). In another example, the reference model may include and/or identify a neural network and a statistical model.

The computing system may instruct navigation of the robot according to the coordinate data. For example, the computing system may instruct navigation of the robot to the location associated with the reference model as part of an inspection mission. Further, the inspection mission may occur subsequent to the initial mission. In some cases, the computing system may not instruct navigation of the robot according to the coordinate data.

At block 1006, the computing system determines a location of a robot (e.g., a first location) corresponds to a location associated with the reference model (e.g., a second location identified by the coordinate data). For example, the computing system may periodically or aperiodically determine whether a location of the robot corresponds to one or more locations associated with one or more reference models.

At block 1008, the computing system obtains sensor data captured from the location of the robot. The computing system may obtain the sensor data via one or more sensors of the robot. The sensor data may include image data. The sensor data may be associated with the location of the robot as part of the inspection mission. For example, the inspection mission may include the collection of sensor data.

At block 1010, the computing system instructs performance of the change detection based on the sensor data and the reference model. In some cases, based on instructing performance of the change detection, the computing system may detect (e.g., identify) a change associated with the location of the robot based on the one or more regions of interest. To detect the change, the computing system may detect a modification to a position, location, orientation, or pose of and/or a presence of one or more of an object, structure, entity, or obstacle in an environment of the robot. For example, the object may include a lever, a door, a button, a switch, a handle, a joint, etc.

The computing system may detect the change based on one or more image processing operations. For example, the computing system may detect the change based on transforming the sensor data using a neural network. In another example, the computing system may detect the change based on performing image differencing using the sensor data. In another example, the computing system may detect the change based on aligning the sensor data with the reference model. In another example, the computing system may detect the change based on adjusting one or more of an illumination, white balance, or color balance of the sensor data. In another example, the computing system may detect the change based on implementing a neural network and providing the sensor data to the neural network. The neural network may be trained to detect changes and/or identify anomaly conditions within sensor data.

The computing system may detect the change based on any combination of the one or more image processing operations. In some cases, the computing system may compare the output of one or more image processing operations. For example, the computing system may obtain a first output based on instructing implementation of the neural network and a second output based on instructing performance of image differencing and may compare the first output and the second output to detect the change.

The computing system may detect changes and/or identify anomaly conditions within the sensor data based on the output of the image processing operations and/or a comparison result of the comparison of the image processing operations. In some cases, the computing system may compare one or more of the output of the image processing operations or the comparison result to a threshold to obtain a second comparison result and may detect changes and/or identify anomaly conditions within the sensor data based on the second comparison result.

In some cases, the output of the one or more image processing operations and/or the comparison result of the comparison of the image processing operations may be one or more labels associated with the sensor data. The one or more labels may identify one or more portions (e.g., pixels) of the sensor data as corresponding to a change and/or an anomaly. For example, the one or more labels may indicate an anomaly status (e.g., an anomaly, not an anomaly, etc.) and/or a change status (e.g., a change, not a change, etc.) of one or more portions of the anomaly data.

Based on the change detection, the computing system can determine whether an anomaly is present in the sensor data. The computing system can determine whether a detected change corresponds to an anomaly. For example, the computing system can determine (e.g., detect, identify) the presence of an anomaly condition based on the detected change and the reference model.

The computing system may provide an output to a user computing device associated with the user based on determination of an anomaly condition. For example, the computing system may instruct display of a user interface indicating an output which may include live feedback identifying the sensor data, the anomaly condition, the detected change, etc.

In some cases, based on determination of an anomaly condition, the computing system may generate log data indicative of the anomaly condition and store the log data. In some cases, the computing system may determine (e.g., generate) an alert based on determination of the anomaly condition and instruct output of the alert.

Figure 11:
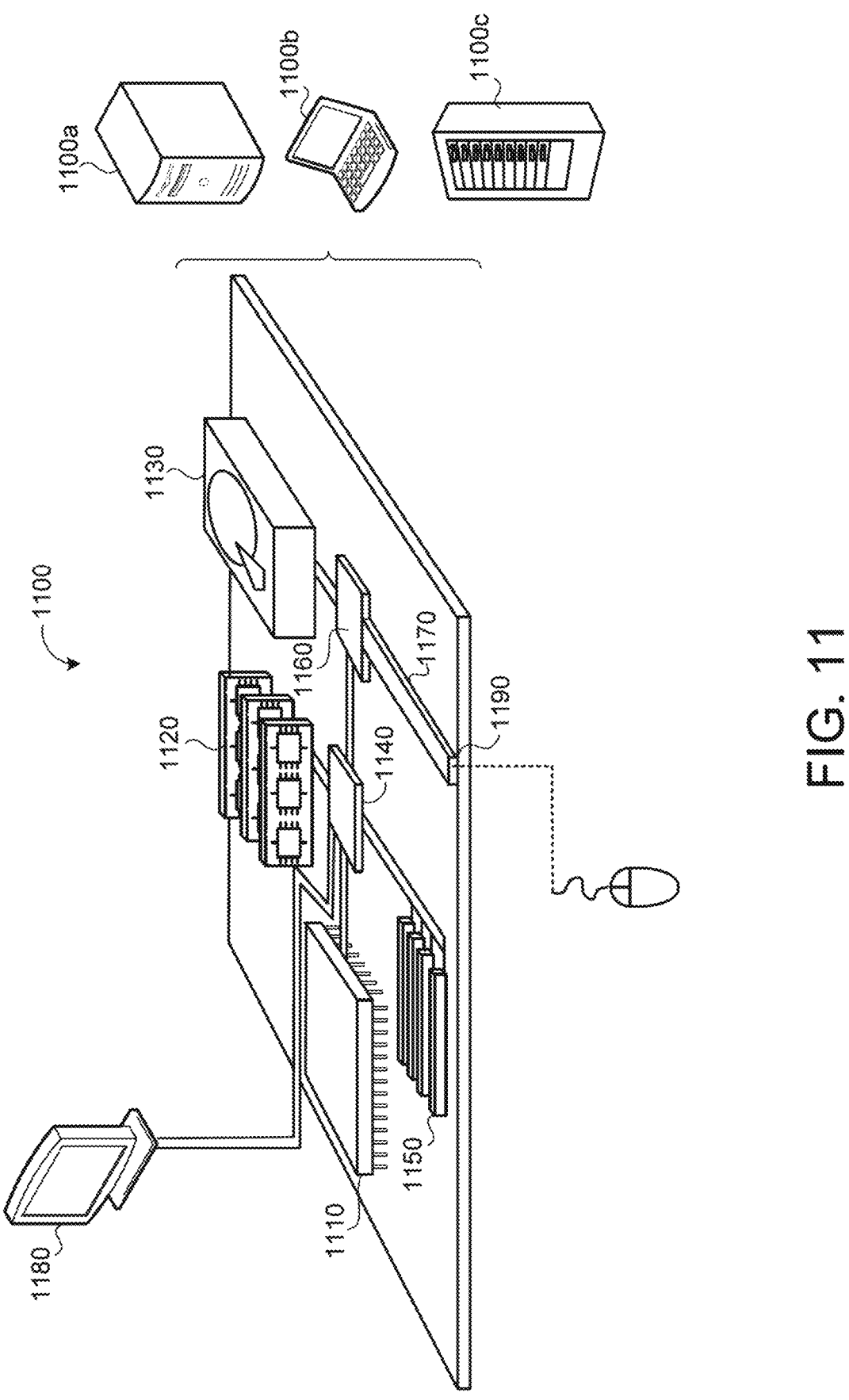
FIG. 11 is a schematic view of an example computing device that may be used to implement the systems and methods described herein.

FIG. 11 is schematic view of an example computing device 1100 that may be used to implement the systems and methods described in this document. The computing device 1100 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1100 includes a processor 1110, memory 1120, a storage device 1130, a high-speed interface/controller 1140 connecting to the memory 1120 and high-speed expansion ports 1150, and a low speed interface/controller 1160 connecting to a low speed bus 1170 and a storage device 1130. Each of the components 1110, 1120, 1130, 1140, 1150, and 1160, are interconnected using various busses, and may be mounted on a common motherboard or in other manners as appropriate. The processor 1110 can process instructions for execution within the computing device 1100, including instructions stored in the memory 1120 or on the storage device 1130 to display graphical information for a graphical user interface (GUI) on an external input/output device, such as display 11110 coupled to high speed interface 1140. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1120 stores information non-transitorily within the computing device 1100. The memory 1120 may be a computer-readable medium, a volatile memory unit(s), or non-volatile memory unit(s). The non-transitory memory 1120 may be physical devices used to store programs (e.g., sequences of instructions) or data (e.g., program state information) on a temporary or permanent basis for use by the computing device 1100. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1130 is capable of providing mass storage for the computing device 1100. In some implementations, the storage device 1130 is a computer-readable medium. In various different implementations, the storage device 1130 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1120, the storage device 1130, or memory on processor 1110.

The high speed controller 1140 manages bandwidth-intensive operations for the computing device 1100, while the low speed controller 1160 manages lower bandwidth-intensive operations. Such allocation of duties is exemplary only. In some implementations, the high-speed controller 1140 is coupled to the memory 1120, the display 1180 (e.g., through a graphics processor or accelerator), and to the high-speed expansion ports 1150, which may accept various expansion cards (not shown). In some implementations, the low-speed controller 1160 is coupled to the storage device 1130 and a low-speed expansion port 1190. The low-speed expansion port 1190, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1100*a* or multiple times in a group of such servers 1100*a*, as a laptop computer 1100*b*, or as part of a rack server system 1100*c*.

Figure 12:
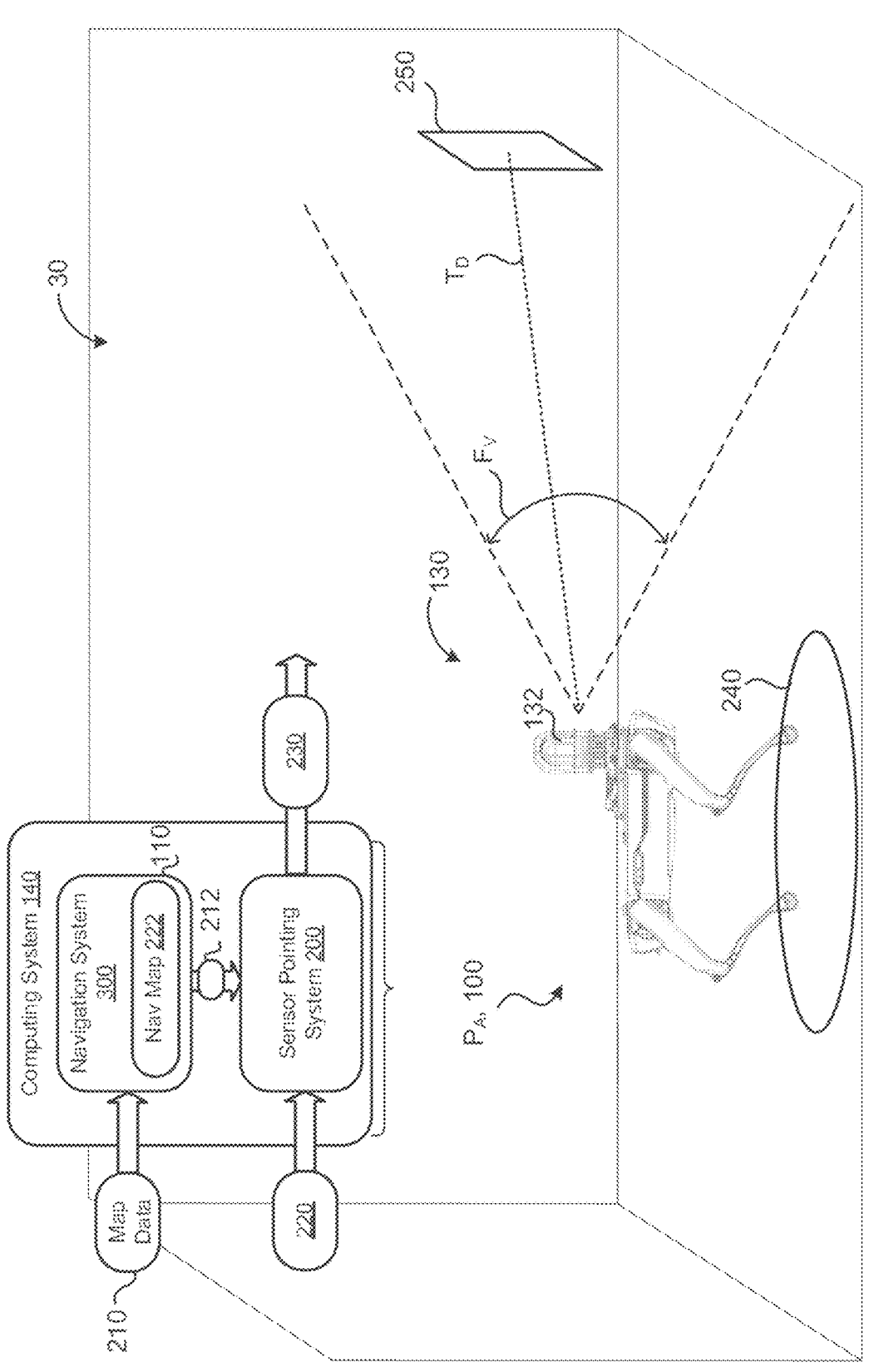
FIG. 12 is a schematic view of a robot with a sensor pointing system according to another embodiment.

FIG. 12 is a schematic view of a robot 100 with a sensor pointing system 200 according to another embodiment. The embodiment of FIG. 12 is similar to the embodiment of FIG.

2, except the robot 100 includes a specific configuration of a PTZ senor shown in FIG. 12.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user. In certain implementations, interaction is facilitated by a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Furthermore, the elements and acts of the various embodiments described above can be combined to provide further embodiments. Indeed, the methods and systems described herein may be embodied in a variety of other forms; furthermore, various omissions, substitutions, and changes in the form of the methods and systems described herein may be made without departing from the spirit of the disclosure. Accordingly, other implementations are within the scope of the following claims.

What is claimed is:

1. A method comprising:
    instructing, by data processing hardware of a mobile robot, navigation of the mobile robot to a location;
    obtaining, by the data processing hardware, image data associated with the location;
    determining, by the data processing hardware, from a set of reference models associated with a set of locations, a reference model associated with the location;
    detecting, by the data processing hardware, based on one or more regions of interest of the image data and the reference model, a change associated with the location; and
    determining, by the data processing hardware, presence of an anomaly condition in the image data based on the detected change the reference model, and anomaly data, wherein the anomaly data indicates one or more first changes do not correspond to anomalies, and wherein the anomaly data indicates one or more second changes do correspond to anomalies.

2. The method of claim 1, wherein the reference model comprises at least one of a neural network, a collection of reference images, or a statistical model encapsulating a set of reference images.

3. The method of claim 1, wherein detecting the change comprises detecting the change based on input from a remote site operator identifying the one or more regions of interest.

4. The method of claim 3, further comprising providing live feedback on the anomaly condition to the remote site operator.

5. The method of claim 1, wherein the anomaly condition comprises a modification of a position of an object at the location.

6. The method of claim 1, wherein the anomaly data indicates one or more parameters for determination of the anomaly condition.

7. The method of claim 1, wherein instructing the navigation of the mobile robot to the location comprises instructing the navigation of the mobile robot to the location as part of an inspection mission, wherein the image data is first image data, the method further comprising:
    instructing navigation of the mobile robot to the location as part of a mission before the inspection mission;
    instructing movement of one or more sensors of the mobile robot to a particular position; and
    instructing capture of second image data by the one or more sensors at the particular position.

8. The method of claim 1, wherein detecting the change comprises detecting a modification to one or more of a position, location, orientation, or pose of one or more of an object, a structure, an entity, or an obstacle in an environment of the mobile robot.

9. The method of claim 1, wherein detecting the change comprises detecting a presence of one or more of an object, a structure, an entity, or an obstacle in an environment of the mobile robot.

10. The method of claim 1, further comprising:
    obtaining an input from a remote site operator identifying the reference model.

11. The method of claim 1, wherein determining the reference model comprises:
    identifying the reference model based on one or more of an inspection mission or the location.

12. The method of claim 1, wherein instructing the navigation of the mobile robot to the location comprises instructing the navigation of the mobile robot to the location as part of an inspection mission, wherein the inspection mission comprises a first mission, and wherein the reference model is associated with a second mission.

13. A robot comprising:
    at least one sensor;
    at least two legs;
    data processing hardware in communication with the at least one sensor; and
    memory in communication with the data processing hardware, the memory storing instructions that when executed on the data processing hardware cause the data processing hardware to:
    receive a first input indicating a change detection;
    receive a reference model associated with the change detection and an identifier of a first location;
    instruct navigation of the robot to a second location;
    determine that the second location corresponds to the first location;
    determine, from a set of reference models associated with a set of locations, the reference model based on determining that the second location corresponds to the first location;
    obtain, by the at least one sensor, first image data captured from the second location; and
    instruct performance of the change detection based on determining that the second location corresponds to the first location, wherein to instruct performance of the change detection, execution of the instructions further causes the data processing hardware to detect presence of an anomaly condition in the first image data based on analyzing the first image data using the reference model and based on one or more regions of interest of the first image data and anomaly data, wherein the anomaly data indicates one or more first changes do not correspond to anomalies, and wherein the anomaly data indicates one or more second changes do correspond to anomalies.

14. The robot of claim 13, wherein the first location comprises one or more of:

a location of the at least one sensor;

a location of one or more additional sensors of a user computing device;

a location of a body of the robot;

a first sub-location of a body of the robot and a second sub-location of the at least one sensor; or a first sub-location of a body of the robot and a second sub-location of one or more additional sensors of a user computing device.

15. The robot of claim 13, wherein the second location comprises a location of the at least one sensor.

16. The robot of claim 13, wherein the execution of the instructions further causes the data processing hardware to:

instruct navigation by the robot to the second location based on a second input.

17. The robot of claim 13, wherein to instruct performance of the change detection, the execution of the instructions further causes the data processing hardware to one or more of:

instruct alignment of the first image data with the reference model;

instruct transformation of the first image data using a neural network;

instruct performance of image differencing using the first image data;

instruct adjustment of one or more of an illumination, a white balance, or a color balance of the first image data; or instruct implementation of a neural network, wherein the first image data is provided to the neural network, wherein the neural network is trained to identify anomaly conditions within image data.

18. The robot of claim 13, wherein to instruct performance of the change detection, the execution of the instructions further causes the data processing hardware to:

instruct implementation of a neural network, wherein the first image data is provided to the neural network, wherein the neural network is trained to identify anomaly conditions within image data; and instruct performance of image differencing using the first image data, wherein the execution of the instructions further causes the data processing hardware to:

obtain a first output based on instructing implementation of the neural network;

obtain a second output based on instructing performance of image differencing;

compare the first output to the second output to obtain a first comparison result;

compare the first comparison result to a threshold value to obtain a second comparison result; and detect presence of the anomaly condition within the first image data based on one or more of the first comparison result or the second comparison result.

19. The robot of claim 13, wherein to receive the reference model, the execution of the instructions further causes the data processing hardware to:

obtain second image data; and identify a portion of the second image data based on the first input, wherein the reference model comprises the portion of the second image data.

20. The robot of claim 13, wherein the execution of the instructions further causes the data processing hardware to:

identify the anomaly condition based on instructing performance of the change detection, wherein the execution of the instructions further causes the data processing hardware to one or more of:

instruct display of a user interface indicating the anomaly condition;

generate log data based on identifying the anomaly condition and storing the log data; or determine an alert based on identifying the anomaly condition and instructing output of the alert.

21. The robot of claim 13, wherein the execution of the instructions further causes the data processing hardware to:

obtain one or more labels associated with the first image data based on instructing performance of the change detection, wherein the one or more labels indicate an anomaly status.

22. The robot of claim 13, wherein the first input indicates one or more of:

the at least one sensor from a plurality of sensors of the robot;

a position of the at least one sensor;

an orientation of the at least one sensor;

a location of the at least one sensor;

a pose of the at least one sensor; or a region of interest within second image data from the at least one sensor.

23. A system comprising:

data processing hardware; and memory in communication with the data processing hardware, the memory storing instructions that when executed on the data processing hardware cause the data processing hardware to:

receive a first input indicating a change detection;

receive, from a set of models associated with a set of change detections, a model associated with the change detection;

determine that a first location of a robot corresponds to a second location;

obtain first sensor data captured from the first location; and instruct performance of the change detection based on determining that the first location of the robot corresponds to the second location, wherein to instruct performance of the change detection, execution of the instructions causes the data processing hardware to detect presence of an anomaly condition based on analyzing the first sensor data using the model and anomaly data, wherein the anomaly data indicates one or more first changes do not correspond to anomalies, and wherein the anomaly data indicates one or more second changes do correspond to anomalies.

* * * * *